(12) United States Patent
Okita et al.

(10) Patent No.: US 7,356,512 B2
(45) Date of Patent: Apr. 8, 2008

(54) CONTENTS MEDIATING SYSTEM AND CONTENTS MEDIATING METHOD

(75) Inventors: Yoshio Okita, Tokyo (JP); Minoru Demura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1159 days.

(21) Appl. No.: 10/323,911

(22) Filed: Dec. 20, 2002

(65) Prior Publication Data
US 2003/0191659 A1 Oct. 9, 2003

(30) Foreign Application Priority Data
Apr. 4, 2002 (JP) .............................. 2002-102052

(51) Int. Cl.
*H04L 9/32* (2006.01)
*H04N 7/16* (2006.01)

(52) U.S. Cl. ..................... 705/51; 705/50; 705/52; 705/64; 705/59; 725/135; 380/200; 380/201

(58) Field of Classification Search .................. 705/52
See application file for complete search history.

(56) References Cited

U.S. PATENT DOCUMENTS

| | | | | |
|---|---|---|---|---|
| 5,920,864 A * | 7/1999 | Zhao | ........................ | 707/10 |
| 6,119,096 A * | 9/2000 | Mann et al. | ................... | 705/5 |
| 6,185,312 B1 * | 2/2001 | Nakamura et al. | ......... | 382/100 |
| 6,226,672 B1 * | 5/2001 | DeMartin et al. | .......... | 709/219 |
| 6,263,318 B1 * | 7/2001 | Kimura et al. | ................ | 705/27 |
| 6,363,356 B1 * | 3/2002 | Horstmann | .................. | 705/26 |
| 6,480,607 B1 * | 11/2002 | Kori et al. | .................. | 380/201 |
| 6,978,020 B2 * | 12/2005 | Taniguchi et al. | ......... | 380/201 |
| 7,054,921 B2 * | 5/2006 | DeMartin et al. | .......... | 709/219 |
| 2001/0013061 A1 * | 8/2001 | DeMartin et al. | .......... | 709/217 |
| 2001/0044810 A1 * | 11/2001 | Timmons | .................... | 707/513 |
| 2001/0051996 A1 * | 12/2001 | Cooper et al. | ............. | 709/217 |

FOREIGN PATENT DOCUMENTS

JP 2001325390 A * 11/2001

OTHER PUBLICATIONS

Pecorella, David; Video-distribution markets look to ATM technology as transport vehicle, Lightwave; Jun. 2000, vol. 17 Issue 7, p. 75, 5p, 3 diagrams, Penn Well Publishing Co.*

* cited by examiner

*Primary Examiner*—Andrew J. Fischer
*Assistant Examiner*—Joshua Murdough
(74) *Attorney, Agent, or Firm*—Venable LLP; Michael A. Sartori; Catherine M. Voorhees

(57) ABSTRACT

A contents mediating system for allowing the user who requests contents to easily obtain cheap contents. A contents storing unit 4 stores contents provided from a provider terminal 1. A contents analysis search unit 6 searches the contents in the contents storing unit 4 on the basis of use request information from a contents user terminal 9 and extracts the contents. A contents distributing unit 303 distributes the contents to a Web contents memory unit 8 which is used by the user. A contents settlement unit 5 makes a charging settlement of a use consideration to the user and a supply settlement of a provision consideration to the provider.

16 Claims, 20 Drawing Sheets

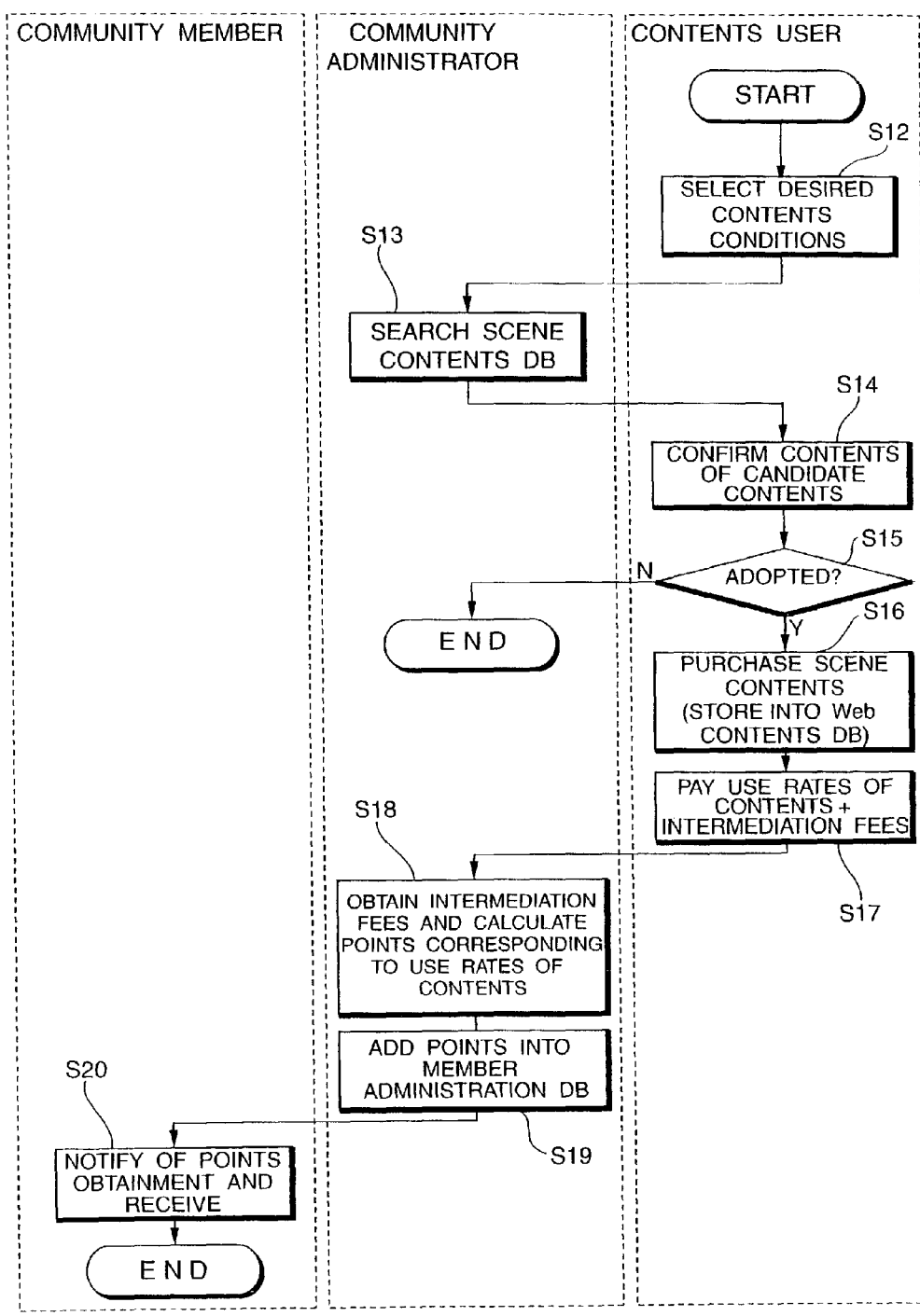

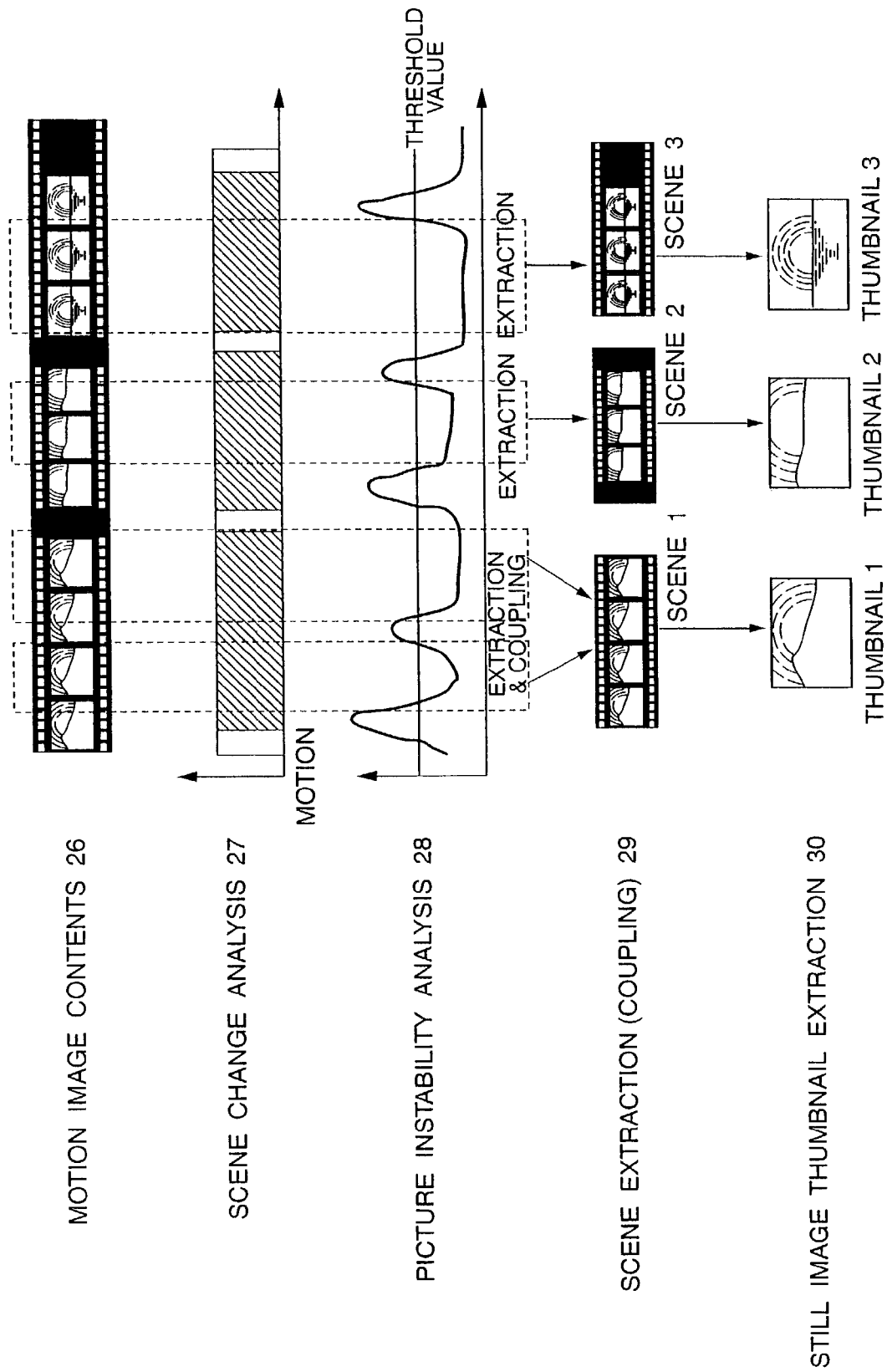

Fig. 8

402: SCENE CONTENTS DB

SCENE CONTENT DATA

| CONTENTS NO. | XXXXXXXXX |
|---|---|
| THUMBNAIL IMAGE | |
| SCENE MOTION IMAGE DATA | |
| REGISTANT MEMBER NO. | YYYYYYYY |
| DATE OF REGISTRATION | *YEARMONTH**DAY |
| DATE OF PHOTOGRAPHING | *YEARMONTH**DAY |
| CLASSIFICATION | TRAVEL |
| PHOTOGRAPHING PLACE | ○○ KEN △△ SHI |
| EXPLANATION | WHEN WE RETURNED TO HOMETOWN ...... |
| EXPLANATION OF SCENE | THIS IS JAPANESE SEA |

— 32

MEMBER PAGE

THANK YOU, MR. △△ FOR REGISTRATION OF CONTENTS. WRITE EXPLANATION OF THE CONTENTS AND PRESS SEND BUTTON.

CLASSIFICATION    PHOTOGRAPHING PLACE  ○○KEN△△SHI
PET                                    2002/01/31
CLASSIFICATION   DATE/TIME PHOTOGRAPHING
TRAVEL
SPORTS
CAR LIFE
PET

COMMENTS   PHOTOGRAPHED WHEN WE RETURNED TO HOMETOWN. IT WAS RATE TO HAVE NICE WEATHER AND THE BEAUTIFUL EVENING SUN.

THERE ARE THE FOLLOWING THREE SCENE IN THE CONTENTS OF MR.△△. PLEASE ADD A SIMPLE EXPLANATION OF EACH SCENE.

SCENE 1    SCENE 2    SCENE 3

SCENE 1 | THIS IS YONEYAMA.
SCENE 2 | MOVED .....
SCENE 3 | THIS IS JAPANESE SEA.

[SEND] [RESET]

— 31

CONTENTS MEDIATING SYSTEM AND CONTENTS MEDIATING METHOD

BACKGROUND OF THE INVENTION

1. Field of the Invention

The invention relates to a contents mediating system and a contents mediating method for giving a mediating service between a contents provider and a contents user.

2. Related Background Art

Company users who intend to commercially use contents for advertisement and publicity for products or services of a company in the form of an advertisement or a commercial or sell the contents themselves is increasing. However, the conventional commercial contents are often made by a professional contents creator and while their quality is high, they tend to be expensive because their making requires much work and money. Therefore, it is difficult to easily and reasonably obtain various contents which can be used commercially.

In recent years, a network community of a contents sharing type such that various contents such as text information, still image, motion image, audio data, and the like formed by an individual are uploaded into a server and data is opened and shared among members on a network has appeared. A number of contents have been registered, and vigorous activities are being performed.

Therefore, if various contents made by the individual can be commercially used in the network community of the contents sharing type as mentioned above, costs to make an advertisement and publicity can be reduced and desired contents can be easily and certainly obtained from the various contents.

However, in a community system of the contents sharing type as mentioned above, use of the contents is limited to hobby-intended sharing and reference by the members and even if commercial use of the contents registered by the individual is intended, it is difficult to sell and buy the contents between the member who registered the contents and the contents user for the following reasons.

(1) There is no means for searching desired contents suitable for commercial use from a number of registered contents.

(2) There is no means for verifying originality of the registered contents and setting copyright information.

And the like.

SUMMARY OF THE INVENTION

It is, therefore, an object of the invention to provide a contents mediating system and a contents mediating method, in which the user who wants to request and use contents can easily obtain the contents provided by the member, that is, provider by using, for example, an existing network community.

To accomplish the above object, the invention uses the following constructions.

<Construction 1>

According to the invention, there is provided a contents mediating system connected via a communicating line to a provider terminal which is operated by a provider who provides contents and a user side system having a user terminal which is operated by the user who requests and uses the contents, respectively, comprising: a storing unit which previously stores each of the contents provided from the provider terminal; an analysis search unit which searches and extracts the contents corresponding to a use request from the storing unit when use request information of the user outputted from the user terminal is received; and a distributing unit which executes contents distribution for distributing the corresponding contents to the user side system.

<Operation>

In the contents mediating system according to the invention, the storing unit previously stores the contents provided from the provider terminal, the analysis search unit searches the contents in the storing unit and extracts the corresponding contents when the use request information outputted from the user terminal is received, and the distributing unit distributes the corresponding contents to the user side system.

Thus, it is possible to allow the user to easily obtain the contents provided by the provider by mediating between the provider terminal and the user terminal. Since the contents is not newly formed by a dedicated provider in accordance with a request of the user, the inexpensive contents can be provided to the user.

The contents mediating system according to the invention can further have a settlement unit which performs a settlement corresponding to a use consideration to be charged for the user and a settlement corresponding to a provision consideration to be paid to the provider on the basis of the contents.

In the contents mediating system according to the invention, the analysis search unit further transmits sample information of the corresponding contents to the user terminal in order to allow the user to confirm the extracted contents and, when acknowledgment information is received from the user terminal, the analysis search unit enables the distributing unit to make the contents distribution.

As contents distribution of the distributing unit, the corresponding contents can be copied and transmitted to the user side system. In this case, a memory unit of the user side system stores the transmitted contents. As a memory unit, a Web memory unit to make a Web page can be used.

As contents distribution of the distributing unit, link information of the corresponding contents in the storing unit is transmitted to the user side system and, when an access request signal including the link information from the user side system is received, the corresponding contents based on the link information can be streamed to the user side system.

In this case, the memory unit of the user side system stores the transmitted link information. As a memory unit, a Web memory unit to make a Web page can be used.

The contents mediating system can further have a settlement unit which performs a settlement corresponding to a use consideration to be charged for the user and a settlement corresponding to a provision consideration to be paid to the provider on the basis of the corresponding contents. The settlement unit can also have: an access counter unit which counts the number of accesses to the storing unit based on the link information; and a settlement executing unit which decides the use consideration and the provision consideration in accordance with the number of accesses detected by the access counter unit.

The settlement unit can also have a function to notify the user of request information regarding the use consideration and a function to notify the provider of supply information regarding the provision consideration.

The contents mediating system according to the invention can further have a copyright information setting unit which, when the contents provided from the provider terminal is received, discriminates whether copyright information has been added to the contents or not and, if the copyright information does not exist, adds the copyright information to the contents. In this case, the storing unit stores the contents added with the copyright information. A digital watermark or the like can be used as copyright information.

In the contents mediating system according to the invention, the analysis search unit has a transmission selecting function for, when the plurality of corresponding contents are searched and extracted on the basis of the use request information, transmitting each sample information of the plurality of corresponding contents to the user terminal and allowing the user to select the most desirable contents.

The analysis search unit can also have a selecting function for extracting and selecting the contents in accordance with a predetermined rule.

Further, the analysis search unit can also have an organizing function for extracting and organizing the contents in accordance with a predetermined rule.

The analysis search unit can also have a collecting unit which collects desired contents if it is determined on the basis of the use request information that the corresponding contents does not exist.

<Construction 2>

According to the invention, there is provided a contents mediating method of allowing the user to obtain contents by mediating between a provider terminal which is operated by a provider who provides the contents and a user side system having a user terminal which is operated by the user who requests and uses the contents so that they can communicate with each other, comprising the steps of: receiving each of the contents from the provider terminal and previously storing them by using a storing unit; searching and extracting the contents corresponding to a use request from the storing unit when use request information of the user outputted from the user terminal is received; and executing contents distribution for distributing the corresponding contents to the user side system.

In the contents mediating method according to the invention, sample information of the corresponding contents is distributed to the user terminal in order to allow the user to confirm the corresponding contents and, when acknowledgment information is received from the user terminal, the contents distribution is executed.

In the contents mediating method according to the invention, further, a use consideration to be charged for the user is calculated and settled on the basis of the corresponding contents and a provision consideration to be paid to the provider is calculated and settled on the basis of the corresponding contents.

The above and other objects and features of the present invention will become apparent from the following detailed description and the appended claims with reference to the accompanying drawings.

BRIEF DESCRIPTION OF THE DRAWINGS

FIG. 6 is a flowchart for the operation which is executed when the contents is searched and provided in the embodiment 1;

FIG. 7 is an explanatory diagram of an analysis of contents;

FIG. 8 is an explanatory diagram of the information registering operation of scene contents;

DETAILED DESCRIPTION OF THE PREFERRED EMBODIMENTS

Embodiments of the invention will be described in detail hereinbelow.

Embodiment 1

<Construction>

Figure 1:
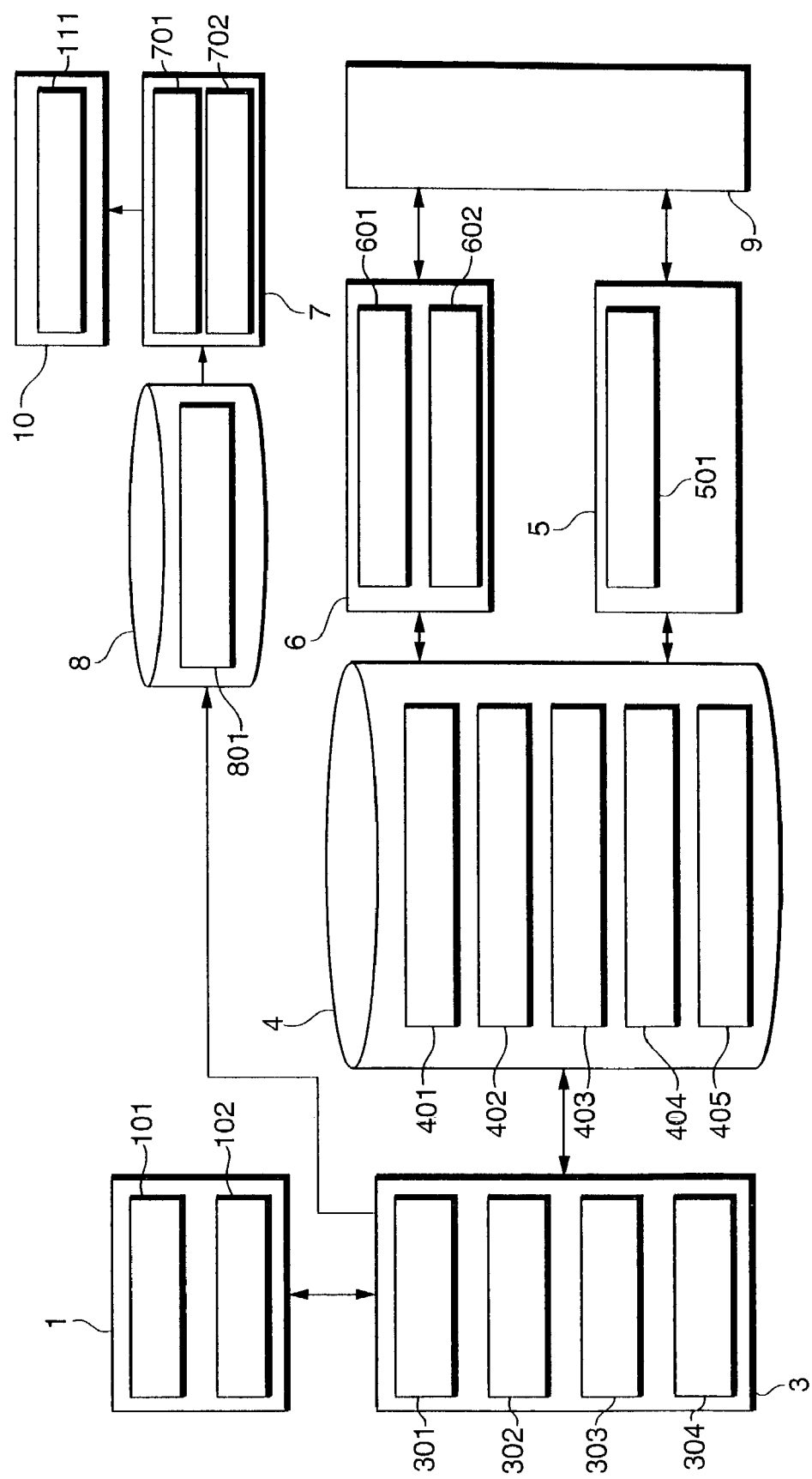
FIG. 1 is an explanatory diagram showing the embodiment 1 of a contents mediating system according to the invention.

FIG. 1 is an explanatory diagram showing the embodiment 1 of a contents mediating system according to the invention. Prior to explaining it, a whole construction of the invention will be described.

Figure 2:
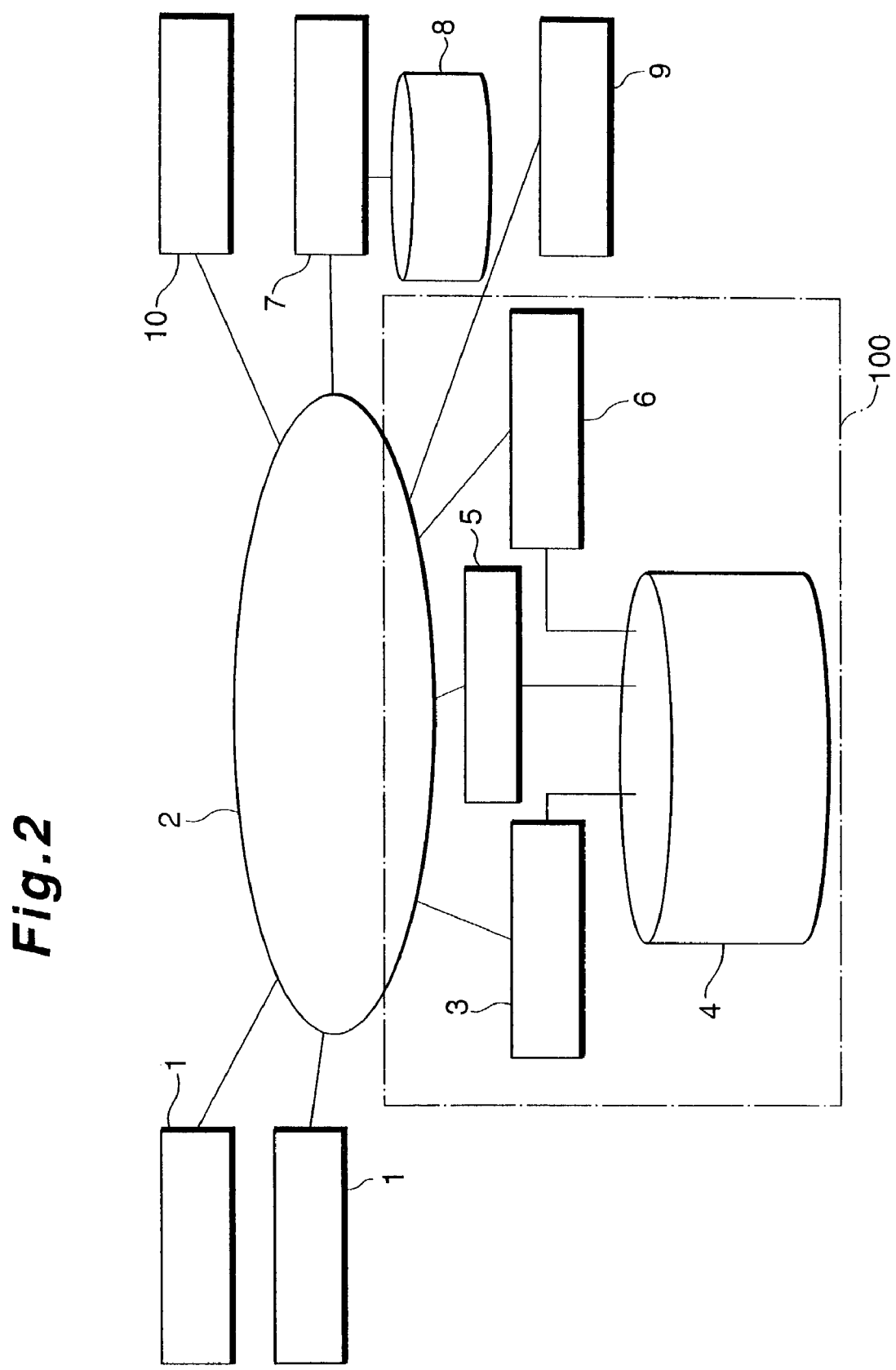
FIG. 2 is a whole constructional diagram of the contents mediating system according to the invention.

FIG. 2 is a whole constructional diagram of the contents mediating system according to the invention.

The system shown in the diagram comprises: member terminals 1 serving as provider terminals; a communication network 2; a contents registration distributing unit 3; a contents storing unit 4; a contents settlement unit 5; a contents analysis search unit 6; a Web service server 7; a Web contents memory unit 8; a contents user terminal 9; and a customer terminal 10.

The member terminal 1 is a terminal which is operated by a member belonging to the community of the contents sharing type and comprises a personal computer or the like. The community denotes an environment where a plurality of members have been registered under predetermined conditions. Actually, a plurality of member terminals 1 are provided. As a community itself, a plurality of communities can also exist.

The communication network 2 is, for example, the Internet and is a network for mutually connecting the member terminal 1, contents registration distributing unit 3, contents settlement unit 5, contents analysis search unit 6, Web service server 7, contents user terminal 9, and customer terminal 10. The contents registration distributing unit 3 is a server for registering and distributing contents which are provided from the members in the community. The contents storing unit 4 is a database for storing the contents registered by the contents registration distributing unit 3. The contents settlement unit 5 is a settlement server. When the contents stored in the contents storing unit 4 is provided to a person who wants to use the contents, the contents settlement unit 5 forms use fees (a use consideration) and intermediation fees from the person who wants to use the contents and pays provision fees (a provision consideration) to the contents provider (member of the community). The contents analysis search unit 6 is a contents analysis and search server having a function such that, when there is a use request from the person who wants to use the contents, the use request is analyzed and the contents corresponding to a result of the analysis is searched from the contents storing unit 4.

The Web service server 7 is a server which is used by the contents user in order to distribute a Web page or the like using the contents. The Web contents memory unit 8 is connected to the server 7. The Web contents memory unit 8 is a memory unit to store the contents obtained by the contents user. The contents user terminal 9 is a terminal which is used by the contents user in order to request the use of the contents or obtain the contents. The terminal 9 comprises a personal computer or the like.

The customer terminal 10 is a terminal of the customer who browses the Web page of the contents user which is distributed by the Web service server 7.

In the embodiment, the contents user terminal 9, Web service server 7, and Web contents memory unit 8 construct a user side system.

In the diagram, reference numeral 100 denotes a contents mediating system according to the invention. The contents mediating system 100 can be also used as a network community having each member terminal which is operated by the member serving as a contents provider, that is, each provider terminal. The contents mediating system 100 can be also used as a system obtained by combining a plurality of communities so that they can communicate mutually.

Each construction of FIG. 2 will be described further in detail hereinbelow with reference to FIG. 1.

In FIG. 1, the member terminal 1 comprises a contents registering unit 101 and a contents reference unit 102. The contents registering unit 101 is a functional unit for registering the contents into the contents registration distributing unit 3 in response to a contents registering request from the member. The contents reference unit 102 is a functional unit which is used by the member in order to refer to the contents stored in the contents storing unit 4 via the contents registration distributing unit 3.

The contents registration distributing unit 3 comprises: a contents receiving unit 301; a copyright information setting unit 302; a contents distributing unit 303; and a member administrating unit 304.

The contents receiving unit 301 is a functional unit for receiving the contents to be registered in response to the contents registering request from the member terminal 1.

The copyright information setting unit 302 has a function to discriminate whether copyright information has already been set in arbitrary contents or not, for example, by checking the presence or absence of a digital watermark and a function for setting the copyright information if no copyright information is set into the contents. The digital watermark, an identification number of the terminal of the copyrighter (member), or the like can be included in the copyright information.

The contents distributing unit 303 is a functional unit for distributing the contents stored in the contents storing unit 4 to the member terminal 1 or the Web contents memory unit 8. For example, if the user uses a terminal side memory unit provided on the user terminal 9 side without using the Web contents memory unit 8, the contents distributing unit 303 distributes the contents in the contents storing unit 4 to the terminal side memory unit.

The member administrating unit 304 is a functional unit for administrating the members of the community on the basis of a member administration database 404, which will be explained hereinlater, in the contents storing unit 4.

The contents storing unit 4 comprises: a contents database (contents DB) 401; a scene contents database (scene contents DB) 402; a point administration database (point administration DB) 403; the member administration database (member administration DB) 404; and a settlement database (settlement DB) 405. The contents database 401 is a database for storing the contents themselves provided by the members. The scene contents database 402 is a database for storing the scene data of the contents. That is, each scene contents analyzed by a contents analyzing unit 601, which will be explained hereinlater, is stored in the scene contents DB 402. The point administration database 403 is a database for administrating points corresponding to payment of the provision fees to the member. The member administration database 404 is a database for storing various member information showing what kind of members exist in the community, and the like. The settlement database 405 is a database for storing settlement information showing what kind of settlement is made to the contents user.

The contents settlement unit 5 has a settlement executing unit 501. The settlement executing unit 501 has a function such that the contents user is charged for the use rates of the used contents and the intermediation fees, a collecting process for collecting them is executed, and the points corresponding to the provision fees of the contents for the contents provider are returned as such provision fees.

The contents analysis search unit 6 has the contents analyzing unit 601 and a contents search unit 602. The contents analyzing unit 601 is a functional unit for receiving the contents use request, that is, the use request information from the contents user terminal 9, and analyzing what kind of contents the user wants to obtain in response to the use request. The contents search unit 602 is a functional unit for searching and extracting desired contents from the contents database 401 in the contents storing unit 4 on the basis of the desired content analyzed by the contents analyzing unit 601. The contents analyzing unit 601 has a function such that if the contents search unit 602 extracts a plurality of desired contents, the contents analyzing unit 601 transmits each representative information of the plurality of extracted contents to the user terminal 9 and allows the user to select desired contents.

The function of each of the contents registration distributing unit 3, the contents settlement unit 5, and the contents analysis search unit 6 is constructed by: software corresponding to each function; and hardware such as CPU, memory, or the like for executing it.

The Web service server 7 has a Web service administrating unit 701 and a Web contents distributing unit 702. The Web service administrating unit 701 is a server for giving various Web services to the customer terminal 10. The Web contents distributing unit 702 is a server for executing a process to distribute the Web page to the customer terminal 10 by using the Web contents data stored in the Web contents memory unit 8.

The Web contents memory unit 8 is a contents storing unit for storing various Web contents and has a Web contents database (Web contents DB) 801. The Web contents database 801 is a database for storing the contents distributed by the contents distributing unit 303.

The customer terminal 10 has a Web reference unit 111. The Web reference unit 111 is a functional unit such as a browser to refer to the Web page distributed by the Web service server 7.

<Operation>

The operation of the embodiment 1 will be described hereinbelow.

Figure 3:
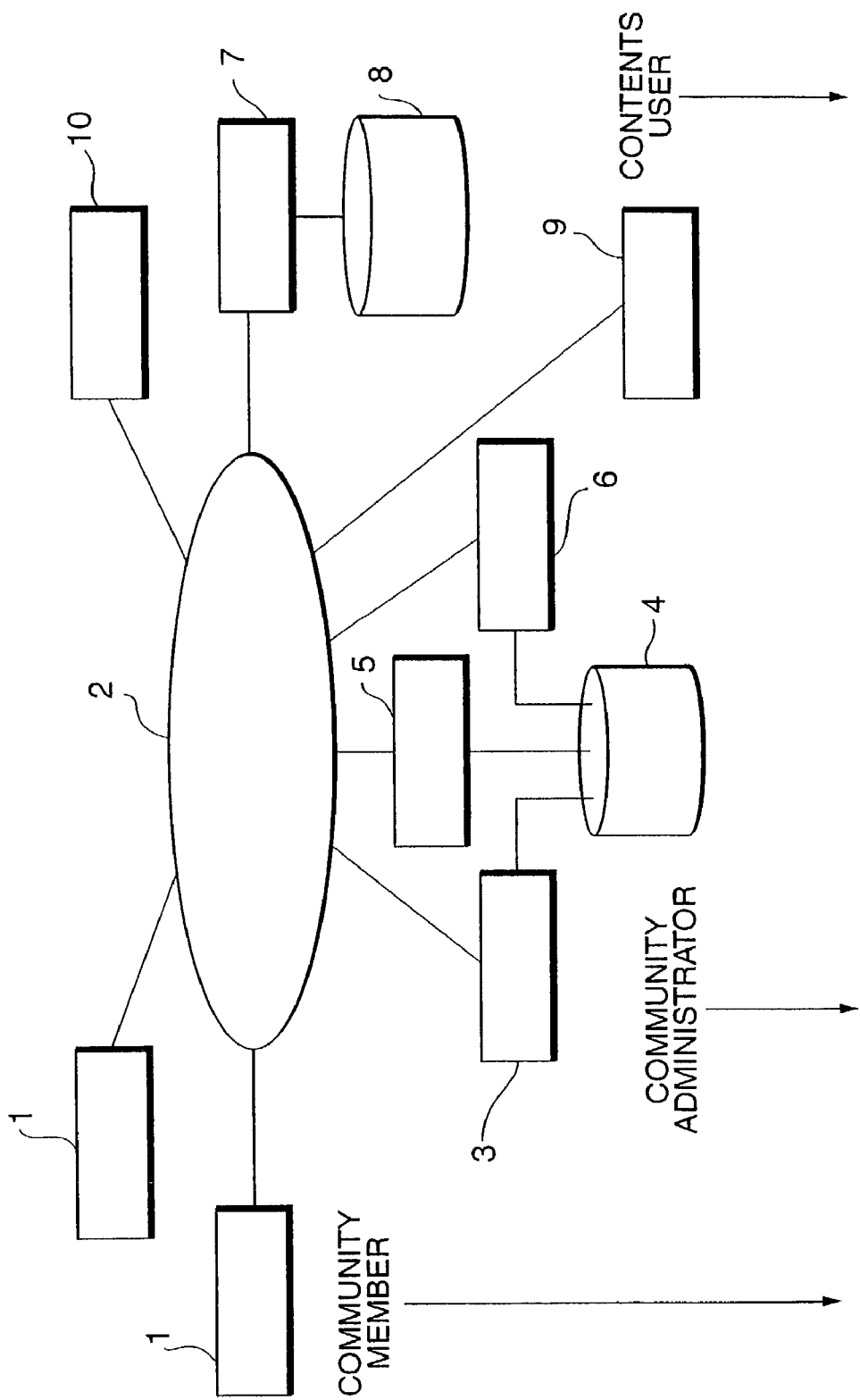
FIG. 3 is an explanatory diagram (part 1) showing a flow of data in the embodiment 1.
Figure 4:
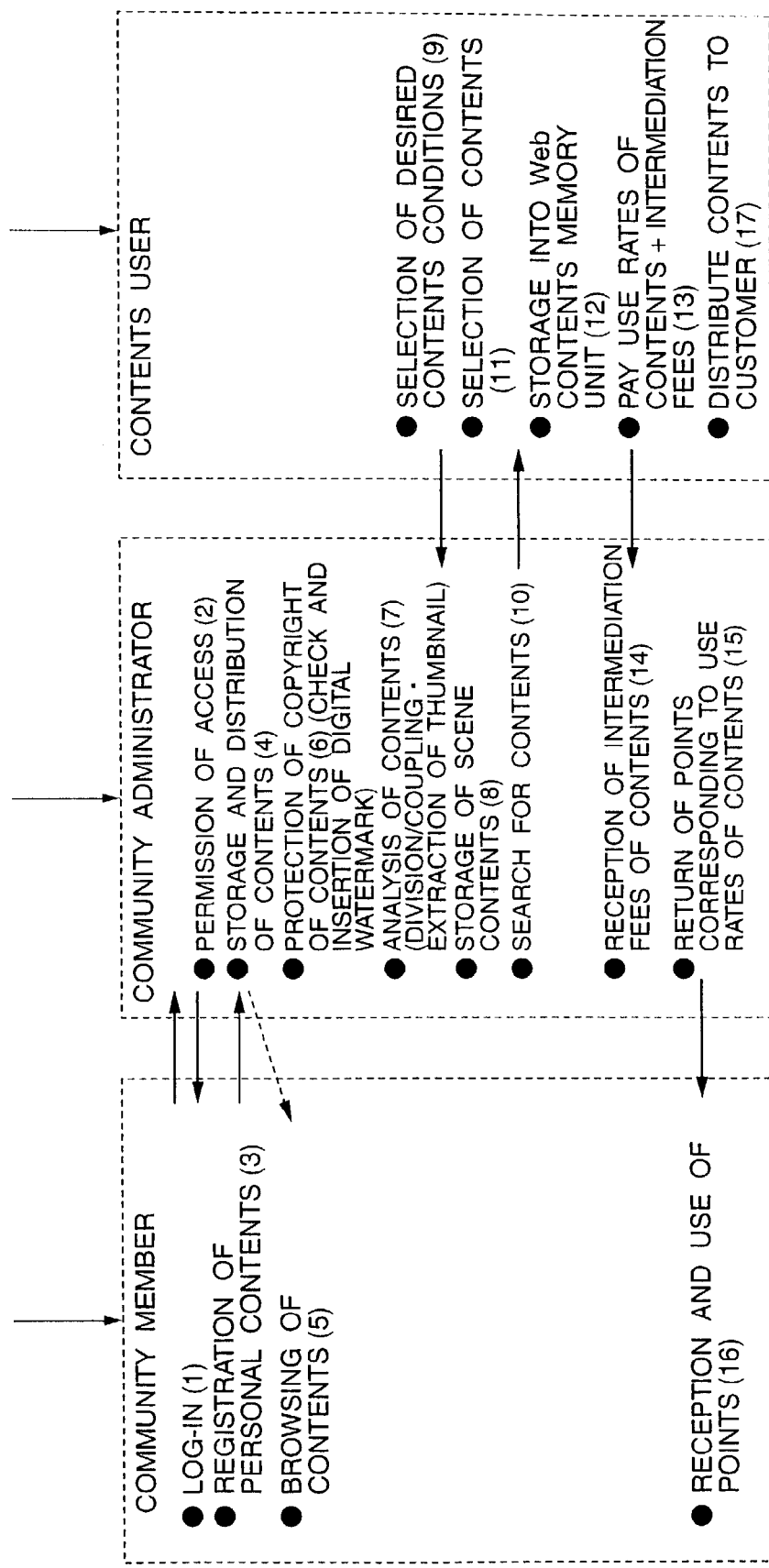
FIG. 4 is an explanatory diagram (part 2) showing a flow of the data in the embodiment 1.

FIGS. 3 and 4 are explanatory diagrams showing a flow of data in the embodiment 1.

Figure 5:
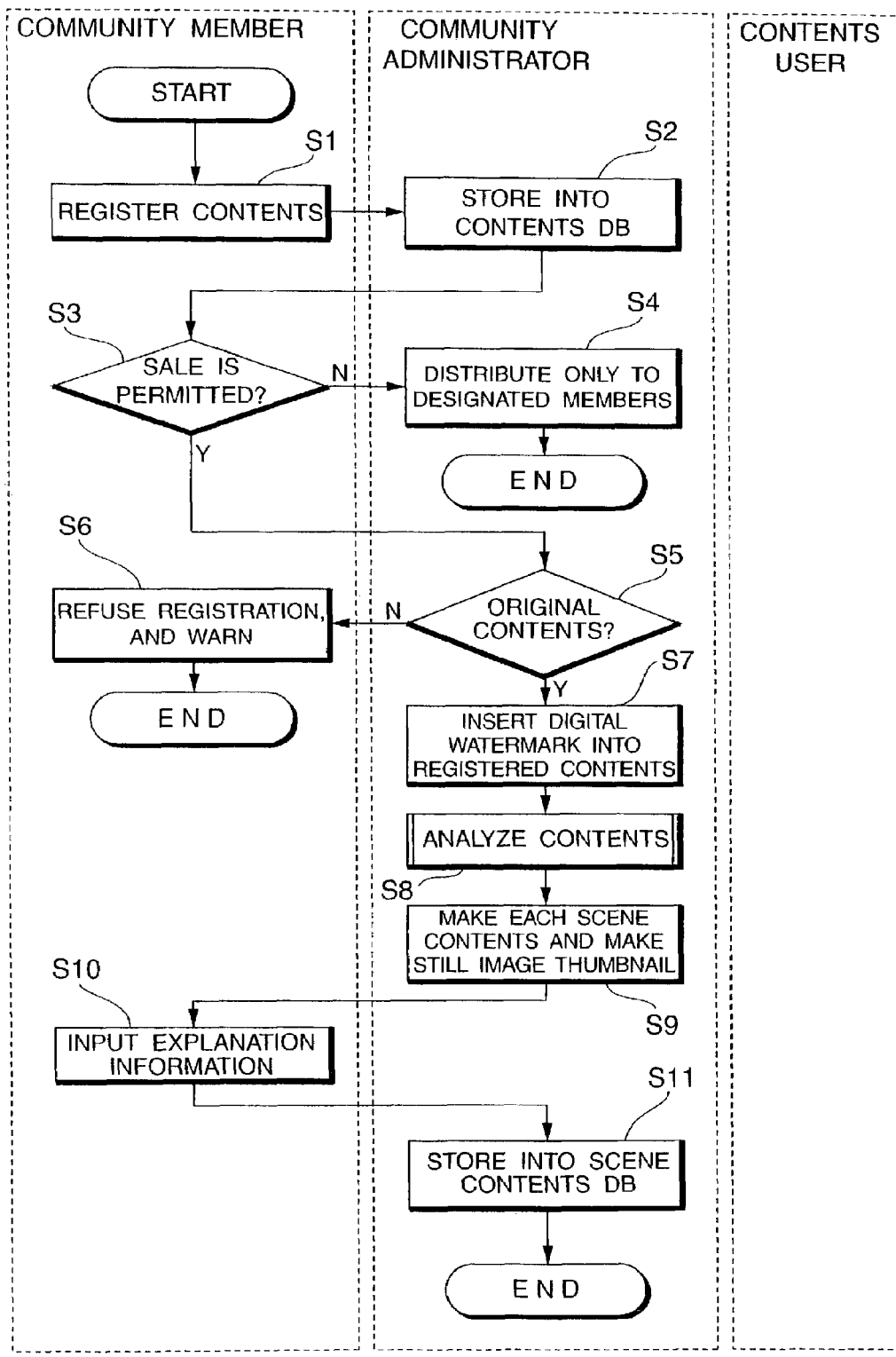
FIG. 5 is a flowchart for the operation which is executed when contents is registered in the embodiment 1.

FIG. 5 is a flowchart for the operation which is executed when contents is registered in the embodiment 1.

FIG. 6 is a flowchart for the operation which is executed when contents is searched and provided in the embodiment 1.

In the following explanation, reference numerals [1] to [4] denote operations regarding the community member and [5] to [7] indicate operations regarding the community administrator (=contents mediating system) and the contents user. In the following description, although a motion image is used as an example of the contents, still image contents will be also processed by the operations in a similar manner.

[1] Log-in:

The community member operates the member terminal 1 and accesses the contents registration distributing unit 3 via the communication network 2. In the contents registration distributing unit 3, the access is received by the member administrating unit 304 and, if it is confirmed that he is a member registered in the member administration database 404, the registration and reference of the contents are permitted ((1) to (2) in FIG. 4).

[2] Contents Registration:

The member who performed the log-in by the operation of [1] operates the member terminal 1 and executes the contents registering operation via the communication network 2 by using the function of the contents registering unit 101. In the contents registration distributing unit 3, the operation is received by the contents receiving unit 301 and the contents to be registered by the member is stored into the contents database 401 and distributed to the member ((3) to (4) in FIG. 4; steps S1 to S2 in FIG. 5).

Upon registration, whether the contents is shared only in the community or the provision to the general contents users is also permitted or not is confirmed to the member. If the contents is shared only in the community, the contents is stored as it is into the contents database 401 and used only for the reference by [3], which will be explained hereinlater (steps S3 to S4 in FIG. 5).

If the provision to the contents users is permitted, whether the copyright information setting unit 302 discriminates whether the copyright information has already been set into the contents or not by checking the presence or absence of the digital watermark. Thus, if the copyright information has already been set into the contents to be registered, the registration is refused. If the copyright information is not set, the digital watermark for setting is inserted into the contents in the contents database 401. ((6) in FIG. 4; steps S5 to S7 in FIG. 5). Since the technique of the digital watermark is well-known, its description is omitted here.

[3] Reference to Contents:

The member who performed the log-in by the operation of [1] operates the member terminal 1 and executes a contents referring operation by the contents reference unit 102. In the contents registration distributing unit 3, the contents distributing unit 303 receives the contents referring operation, extracts the contents which is desired by the member from the contents database 401, and distributes it to the member terminal 1 via the communication network 2 ((5) in FIG. 4).

[4] Analysis of Contents:

Among the contents stored in the contents database 401 by the operation of [2], the contents in which the providing to the contents user is permitted is subjected to an analysis of the scene by the contents analyzing unit 601 in the contents analysis search unit 6. The contents analyzing unit 601 analyzes a pan (lateral oscillation of the picture plane), a tilt (vertical oscillation of the picture plane), and a zoom (perspective of a focal point) of each frame of the motion image contents stored in the contents database 401 and a motion speed (degree of change in the picture plane) of the picture plane and extracts a portion where the picture plane is stable. If a plurality of picture planes are included in one contents, the contents is divided every scene. Further, a representative frame which is most stable in the scene is extracted as a still image thumbnail by the analysis of the pan, tilt, zoom, and motion speed of each picture plane ((7) in FIG. 4; steps S8 to S9 in FIG. 5). Details of the analyzing process of the scene will be explained hereinlater.

With respect to each scene extracted as mentioned above, the contents analysis search unit 6 sends the still image thumbnail to the member terminal 1. If the member adds an explanation to the motion image contents and each scene from the member terminal 1, the contents analysis search unit 6 registers a set comprising the data of each scene, the thumbnail and the explanation of the member into the scene contents database 402 ((8) in FIG. 4; steps S10 to S11 n FIG. 5).

[5] Search of Contents:

In response to the use request, the contents search unit 602 searches and extracts desired scene contents from the scene contents stored in the scene contents database 402. In the extracted scene contents, an order of a matching degree, that is, a similarity with a template image requested by the user is allocated in response to the use request of the contents user, presented to the contents user, and selected ((9) to (10) in FIG. 4; steps S12 to S14 in FIG. 6). Details of the searching operation will be also explained hereinlater.

In the embodiment, for example, if the contents search unit 602 extracts one or a plurality of corresponding contents from the contents storing unit in response to the use request, in order to present them to the contents user and allow him to select desired contents, the contents analyzing unit 601 analyzes the corresponding contents and transmits only the sample information thereof to the user terminal 9.

After the contents analysis search unit 6 received acknowledgment information or the like outputted from the user terminal 9, the contents distributing unit 303 distributes the desired corresponding contents to the Web contents memory unit 8 on the basis of the acknowledgment information.

[6] Mediation of Contents:

If the corresponding scene contents searched by the operation of [5] is confirmed by the contents user and a copy of the corresponding scene contents is transmitted to the Web contents memory unit 8 by the contents distributing unit 303 and stored into the Web contents database 801, the contents settlement unit 5 transmits request information including predetermined use rates of the contents and intermediation fees obtained on the basis of the transmitted corresponding contents to the contents user terminal 9 and notifies the user of the request information. The contents settlement unit receives, for example, account information such as an account number and the like of the user from the user terminal 9 ((11) to (13) in FIG. 4; steps S15 to S17 in FIG. 6) and makes an electronic settlement by using those account information. As a settling method, for example, a settling method such as credit card settlement, Internet debit settlement, or prepaid card by which a settlement can be made via the communication network 2 can be used.

In the case where the provision consideration is paid to the member, that is, the provider, the contents settlement unit 5 can transmit the supply information including the provision fees of the contents to the member terminal 1 and notify the user of it on the basis of, for example, an identification number of the member included in the copyright information added to the corresponding contents transmitted to the Web contents memory unit 8. The contents settlement unit 5 can receive, for example, the account information including the account number and the like of the member from the member terminal 1 and make an electronic supply settlement by using the account information.

Unlike the electronic settlement using the account information for the settlement to pay the provision fees to the member, in the embodiment, the contents settlement unit 5 adds points corresponding to the provision fees of the contents to data of the member (contents provider) in the point administration database 403 and notifies the member of the points ((14) and (15) in FIG. 4; steps S18 to S19 in FIG. 6). This notification is made by a display on a reference picture plane of the member or by E-mail to the member. The member can use the obtained points for the services in the community or can also receive cash corresponding to the obtained points by cashing means which is provided by the community ((16) in FIG. 4; step S20 in FIG. 6).

The points correspond to the cash which is available only in the community. The cashing means in the community is means corresponding to what is called a cash back. Since the services which are provided in the community are not directly concerned with the invention, their description is omitted here.

Further, it is assumed that the fee which is paid by the contents user (use rates of the contents+intermediation fees of the contents) and the point return value to the contents provider are properly determined in accordance with providing conditions, kind of contents, and the like.

[7] Use of Contents:

The scene contents stored in the Web contents database 801 by the operation of [6] is assembled into the Web services which are given by the contents user by the Web service administrating unit 701, distributed to the Web reference unit 111 of the customer terminal 10 by the Web contents distributing unit 702, and referred to by the customer of the contents user ((17) in FIG. 4).

[Analyzing Operation of the Contents]

It is the operation which has already schematically been explained in the operation of [4].

FIG. 7 is an explanatory diagram of an analysis of contents.

In the diagram, reference numeral 26 denotes original motion image contents serving as a target of the analysis. First, the contents analyzing unit 601 analyzes what kinds of scenes are included in such motion image contents 26 on the basis of the pan, tilt, and zoom of each frame and the motion speed of the picture plane and extracts the scenes. A scene change analysis 27 shows such a state as mentioned above and analyzes three scenes from the motion image contents 26. Subsequently, the contents analyzing unit 601 analyzes instability of each scene from a result of the scene change analysis 27. As shown in a picture instability analysis 28, for example, portions where the motion speed of the picture plane is equal to or less than a threshold value, that is, a motion of the picture plane is equal to or less than a predetermined value are extracted and their frames are coupled. A result obtained by extracting and coupling them is a scene extraction (coupling) 29. The contents analyzing unit 601 further extracts the most stable frame in the scene as a still image thumbnail from the result of the scene extraction (coupling) 29 by the analysis of the pan, tilt, and zoom of each frame in each scene and the motion speed of the picture plane. A result of the extraction is a frame shown in a still image thumbnail extraction 30. As mentioned above, the contents analysis search unit 6 selects or reorganizes the contents, for example, in accordance with a predetermined rule such that the motion speed of the picture plane is equal to or less than a threshold value and extracts the usable contents. In this case, the contents analysis search unit 6 has a function for selecting or organizing each of the extracted contents.

[Information Registering Operation of Scene Contents]

It corresponds to the operation to register information of the scene contents in the description in the operation of [4] mentioned above.

FIG. 8 is an explanatory diagram of the information registering operation of the scene contents.

In the diagram, a picture plane 31 denotes an example of a picture plane which is used by the member in order to input information with respect to the information of the contents presented to the member terminal 1. A list of still image thumbnails (data of the still image thumbnail extraction 30 in FIG. 7) is displayed here and a comment to those scene is issued and the comment for each scene is requested. When the member inputs the comments to such a picture plane, the contents analyzing unit 601 stores data such as scene contents data 32 in the diagram into the scene contents database 402. That is, the scene contents data 32 comprises the following data: a contents number to identify each scene contents; a thumbnail image of the scene contents; scene motion image data obtained by extracting a stable portion of the scene contents; a registrant member number to identify the contents provider; a date of registration of the contents; a date of photographing, a classification, a photographing place of the contents; an explanation common to each scene contents; and an explanation for each scene. Those data is stored into the scene contents database 402.

[Searching Operation of the Contents]

It is the operation schematically described in the operation of [5] mentioned above.

Figure 9:
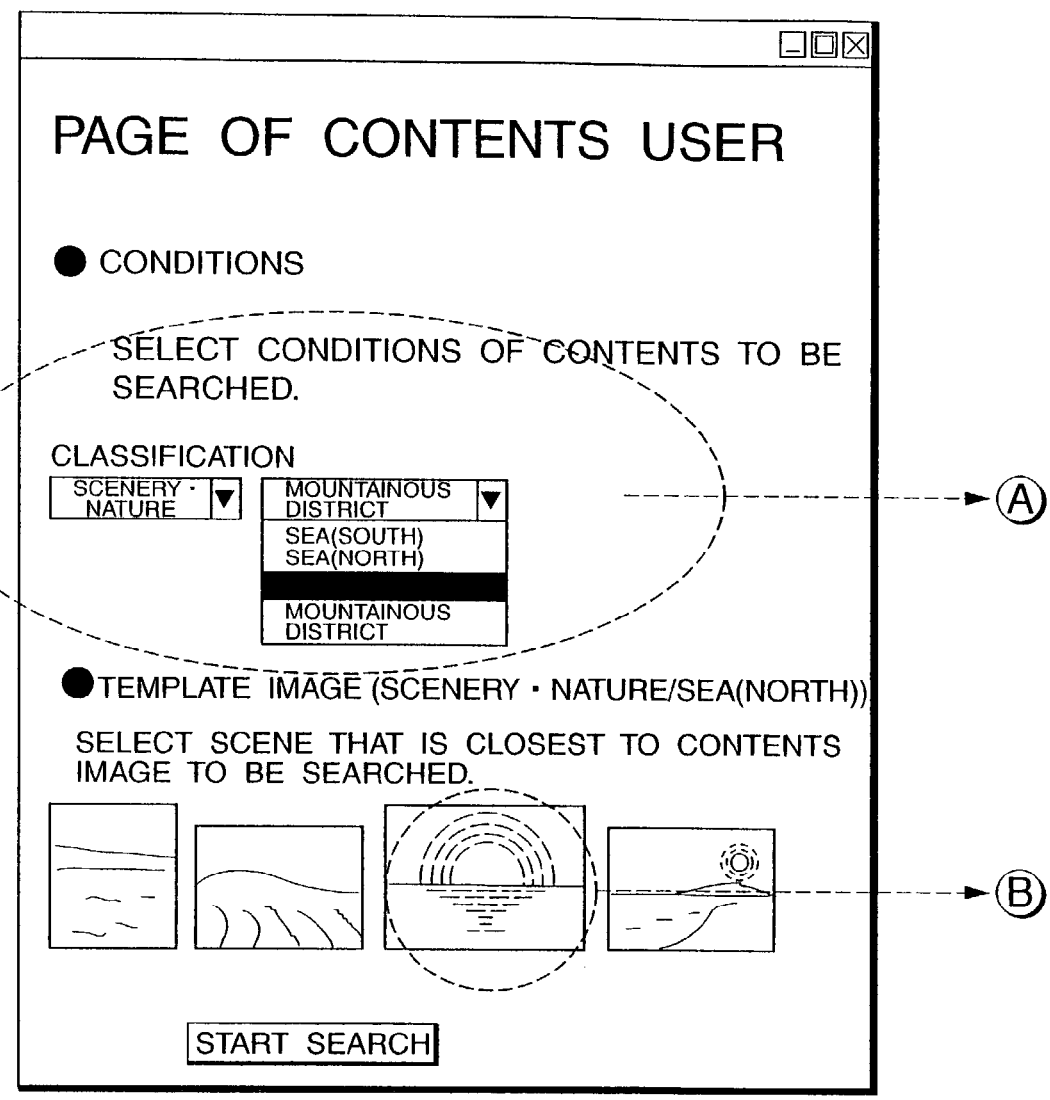
FIG. 9 is an explanatory diagram (part 1) of the searching operation of contents.
Figure 10:
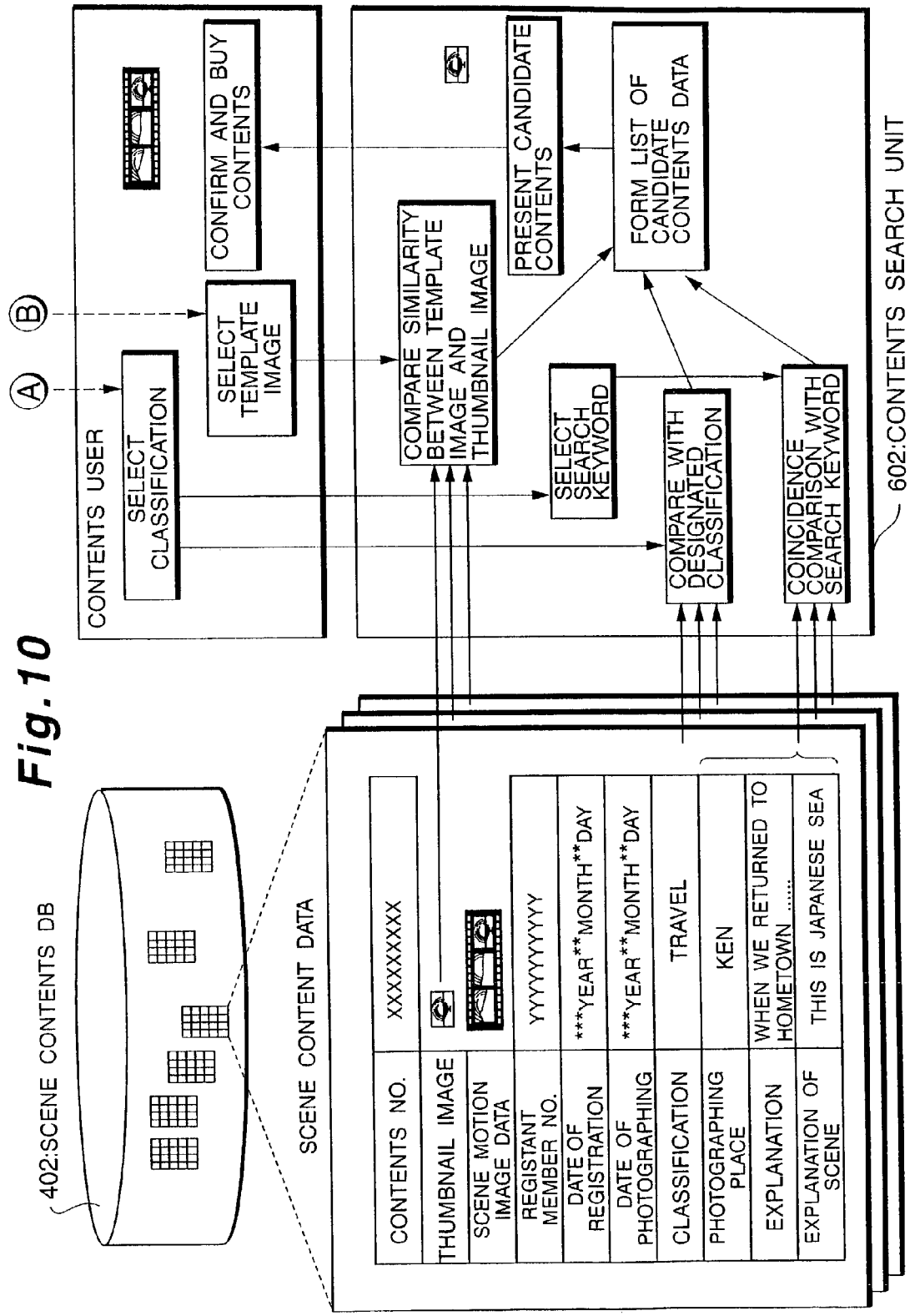
FIG. 10 is an explanatory diagram (part 2) of the searching operation of the contents.

FIGS. 9 and 10 are explanatory diagrams of the searching operation of the contents.

In the diagram, a picture plane 33 denotes an example of a picture plane which is used by the contents user in order to select conditions of desired contents. This picture plane is presented by the contents search unit 602. The contents user executes a predetermined selecting operation to the picture plane 33. For example, first, a classification of desired contents is selected. Thus, the contents search unit 602 displays templates of a plurality of scenes corresponding to the selected classification. It is assumed that the contents search unit 602 has preliminarily had the template images.

When the contents user selects the scene that is closest to the desired scene from those templates, the contents search unit 602 compares a similarity (template matching) between the selected template image and the thumbnail image in the scene contents database 402 together with the selected classification. As conditions which are designated from the contents user, besides the items as mentioned above, keywords such as name of place of the photographing location and situation upon photographing, that is, text information can be also added as searching conditions. If such keywords are designated, the contents search unit 602 searches the scene contents database 402 while including the keywords. That is, whether the keywords designated from the contents user are included in the photographing location and explanation in the scene contents data or not is discriminated. It is assumed that a well-known method is used with respect to the template matching.

By such a search, a plurality of scene contents data having high similarity is extracted as candidate contents data and a list of them is formed. The contents search unit 602 sends the candidate contents to the contents user terminal 9. The contents user terminal 9 displays such a list. The contents user selects the desired contents from the list, confirms it, and determines whether he buys it or not. By the buying operation, the contents settlement unit 5 is activated and executes a predetermined settling process such as a credit card settlement. The contents distributing unit 303 in the contents registration distributing unit 3 is activated and distributes a copy of the scene contents in the scene contents database 402 to the Web contents memory unit 8.

In the above searching process, instead of an actual photograph, an illustration image, a computer graphics image, or the like can be also used as a template image.

Further, on the basis of an instruction from the contents user, the contents search unit 602 adds a change in brightness, saturation, contrast, or the like to the whole template image or a specific area or executes an image process such as a filtering process or the like and can use a resultant image as a template image of the contents which is desired by the contents user. That is, in the above template image selection, such a function is added as an option. For example, in the template image selection, it is now assumed that the contents user selected a scenery of the evening sun and added an instruction "slightly reddish image" to the selected image. In such a case, the contents search unit 602 processes the image selected by the contents user and displays the processed image. If the contents user acknowledges the selected image, it is determined as a template image. Or, it is also possible to construct the system in a manner such that a tool for executing the image process to the template image is prepared and the contents user processes it by using this tool.

As a list of the candidate contents data, not only the still image thumbnails (the still image thumbnail extraction 30 in FIG. 7) but also the data of the scene extraction (coupling) 29 or the data of a predetermined time in the motion image contents 26 can be also displayed as a preview picture plane.

[Administration of the Points]

Figure 11:
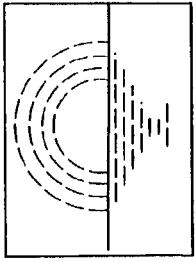
FIG. 11 is an explanatory diagram of a point return to the contents provider.

FIG. 11 is an explanatory diagram of a point return to the contents provider.

When the contents user determines the purchase of the contents, the contents settlement unit 5 executes a point returning process to the member (contents provider). By this process, picture plane data as shown in a picture plane 34 in the diagram is sent to the member terminal 1. That is, as shown in member point data 35 in the diagram, the contents settlement unit 5 extracts a value of the points obtained so far from the point administration database 403 and displays the obtained points corresponding to the contents provided this time together with the image of the contents provided this time.

[Use Example of the Contents by the Contents User]

Figure 12:
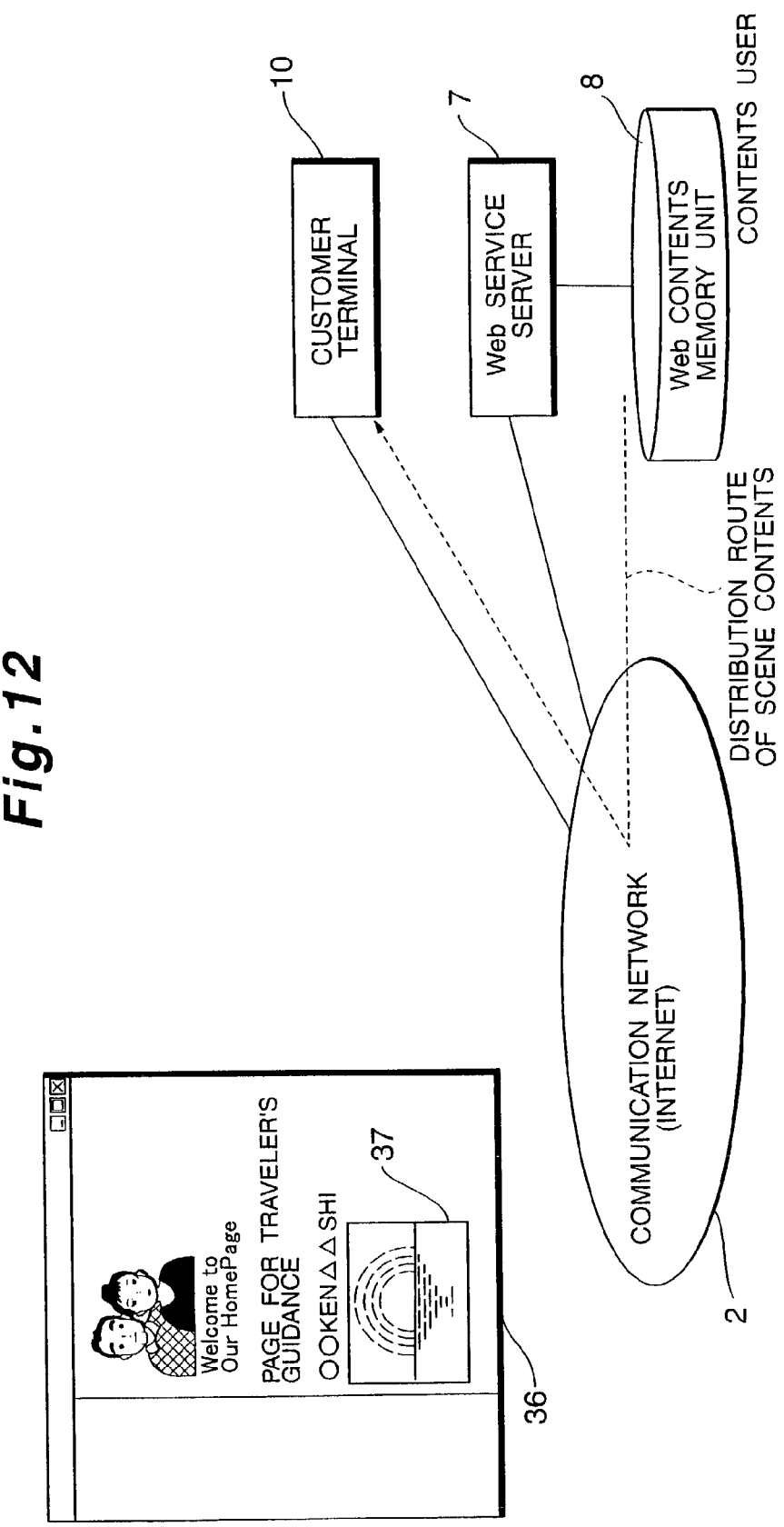
FIG. 12 is an explanatory diagram showing a use example of the scene contents by the contents user.

FIG. 12 is an explanatory diagram showing a use example of the scene contents by the contents user.

The Web service server 7 provides a Web service picture plane 36 to an arbitrary customer. An image 37 is a thumbnail stored in the Web contents memory unit 8. When the customer clicks the image 37, motion image contents is distributed from the Web contents memory unit 8 via the Web service server 7 and reproduced as a Web service picture plane 36 (a motion image contents thereon) onto a screen of the customer terminal 10. As a use example of such scene contents, not only the use to the Web service as mentioned above but also use to another medium such as advertisement, commercial, brochure, poster, or the like can be considered.

Although the case where the scene contents in the scene contents database 402 is used as a mediation target has been described above, the contents itself (motion image contents 26 in FIG. 7) in the contents database 401 in which the providing to the contents user is permitted can be also used as a mediation target. Further, a portion designated by the contents user can be also used as scene contents. That is, it is also possible to construct the system in a manner such that the user can designate an arbitrary portion from the motion image contents 26 in FIG. 7 or from the data of the scene extraction (coupling) 29.

Although the contents registering unit 101 and the contents reference unit 102 have been provided for the member terminal 1, the functions of them can be also provided for the contents registration distributing unit 3. In this case, their functions can be also used from the member terminal 1 via, for example, the Web browser.

<Effects>

As mentioned above, according to the embodiment 1, for the contents which is provided by the contents user, the contents which is requested by the contents provider is searched and provided and the use rates from the contents user and the payment of the provision fees of the contents to the contents provider are executed, so that there are the following effects.

The contents user can search the desired contents from a number of motion images and still image contents registered by the contents provider and purchase it. After the copyright information regarding the contents was set, the contents provider can receive a sales profit according to the points at the time when the contents is used. Further, the community administrator can obtain a profit of the intermediation fees by mediating a contents transaction which is made between the contents user and the contents provider.

Thus, even if the contents user does not buy expensive commercial contents, he can easily, reasonably, and certainly obtain various contents which can be commercially used. Even a creator of personal contents can get a consideration for the contents made as his hobby. It is possible to contribute to a growth of the network community of the contents sharing type.

In the above embodiment, since the points are returned to the contents provider, as compared with the method of payment by the cash, there is an effect such that the administration of the settlement can be easily made by both of the contents provider and the contents mediating system 100.

Embodiment 2

According to the embodiment 2, the copy of the contents is not sent to the contents user but the link information of the contents is sent as a using state of the contents.

<Construction>

Figure 13:
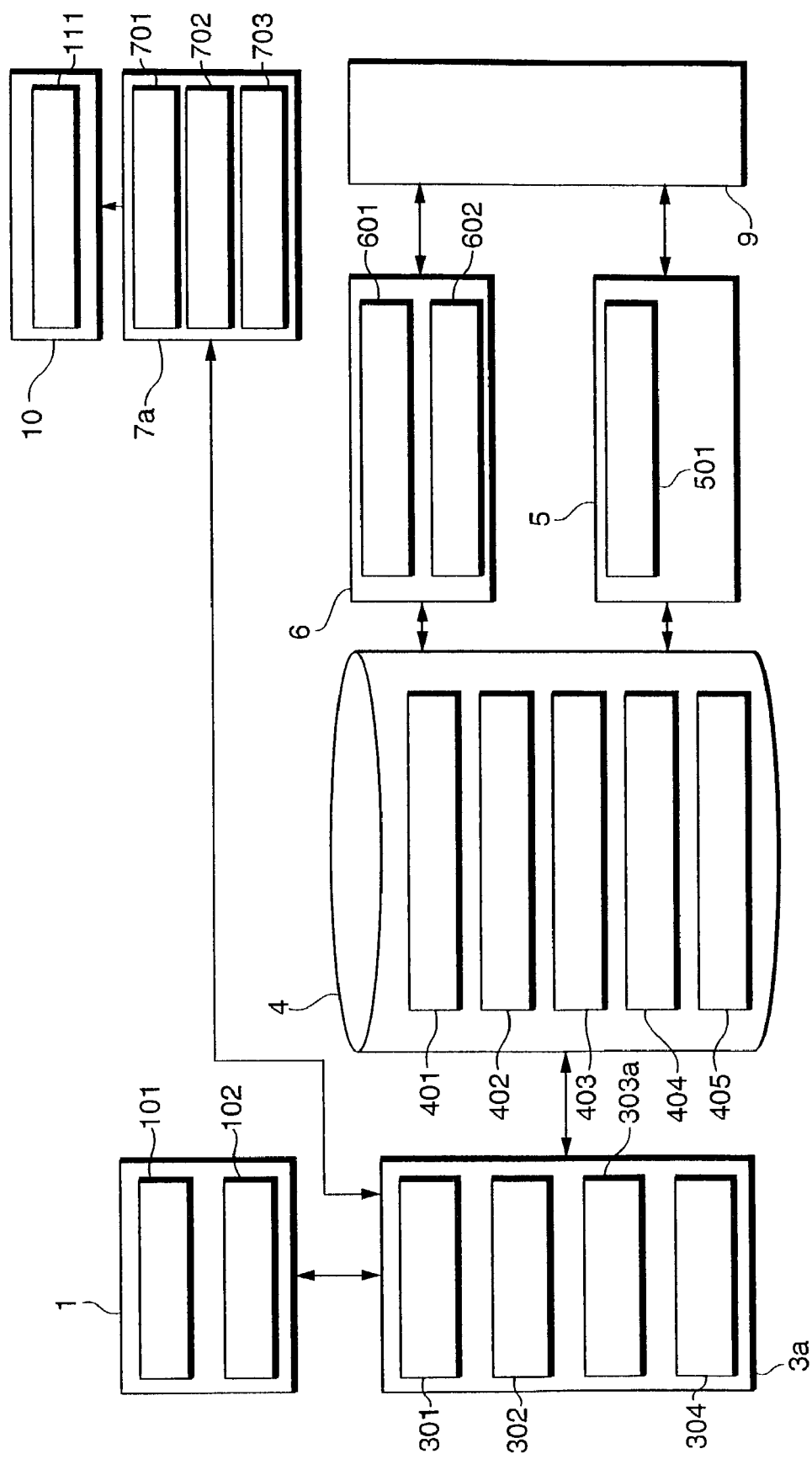
FIG. 13 is an explanatory diagram of the embodiment 2.

FIG. 13 is an explanatory diagram of the embodiment 2.

According to a contents mediating system of the embodiment 2, the Web contents memory unit 8 in the embodiment 1 is omitted and a contents link database (contents link DB) 703 added to a Web service server 7a. The function of a contents distributing unit 303a of a contents registration distributing unit 3a is constructed in a manner such that the copy of the contents is not distributed but link destination information of the contents is transmitted. Since a construction of each of the other component elements is similar to that in the embodiment 1, the corresponding portions are designated by the same reference numerals and their descriptions are omitted.

<Operation>

In the embodiment 2, since the operations other than the contents distributing operation in the contents mediating system are similar to those in the embodiment 1, only the different operations will be described.

When the contents user determines use of arbitrary contents, the contents distributing unit 303a is activated. As link destination information of the contents, URL (Uniform Resource Locator) information, that is, storing location information of the contents in the scene contents database 402 is distributed as link destination information of the contents to the Web service server 7a. In the Web service server 7a, the link destination information is stored into the contents link database 703.

Figure 14:
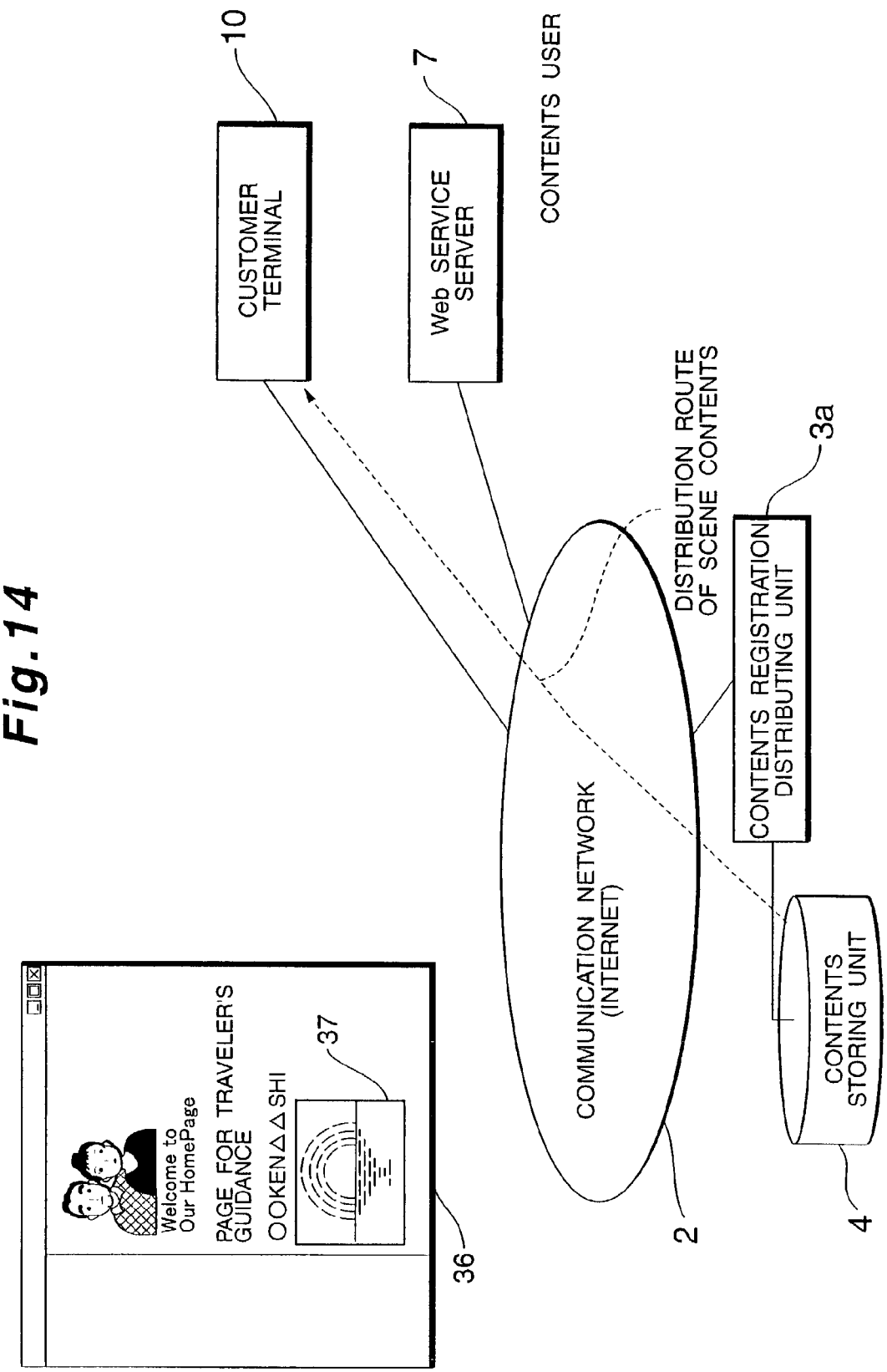
FIG. 14 is an explanatory diagram a use example of contents in the embodiment 2.

FIG. 14 is an explanatory diagram of a use example of contents in the embodiment 2.

This diagram corresponds to FIG. 12 in the embodiment 1.

When the customer clicks the image 37 (contents icon) in the diagram, the Web service server 7a extracts a URL of the contents from the contents link database 703 and accesses the URL. Thus, the contents registration distributing unit 3a permits use of it, extracts the contents according to the request from the scene contents database 402, and distributes it. The Web service server 7a distributes the distributed contents as a Web service picture plane 36 to the customer terminal 10.

Since the other operations are similar to those in the embodiment 1, their descriptions are omitted here.

<Effects>

According to the embodiment 2 as mentioned above, since the link destination information is distributed to the contents user instead of the copy of the contents, the following effects are obtained as compared with those in the embodiment 1.

That is, it is possible to use a form such that the scene contents data itself is not copied to the contents user but is streamed and distributed via the contents mediating system in accordance with the needs for the contents user, and only the reproduction is permitted. Illegal use of the contents such that the copied contents is used in common to another medium can be prevented.

Also on the contents user side, since there is no need to prepare the system for storage and distribution of the contents, the Web service including the scene contents distribution can be easily established and administrated.

Further, as a sales form of the contents, for example, if a link to the whole contents produced by a specific contents provider is used, it is also possible to realize the Web service in which the contents which is arbitrarily updated is automatically reflected. That is, in this case, the contents of the URL instead of the specific contents is arbitrarily updated as a distribution target.

In the embodiment 2, it is also possible to construct a system such that the number of times of access to the contents of the link destination is counted and the contents user pays use rates in accordance with a count value. Such a system will be described as a modification of the embodiment 2.

Figure 15:
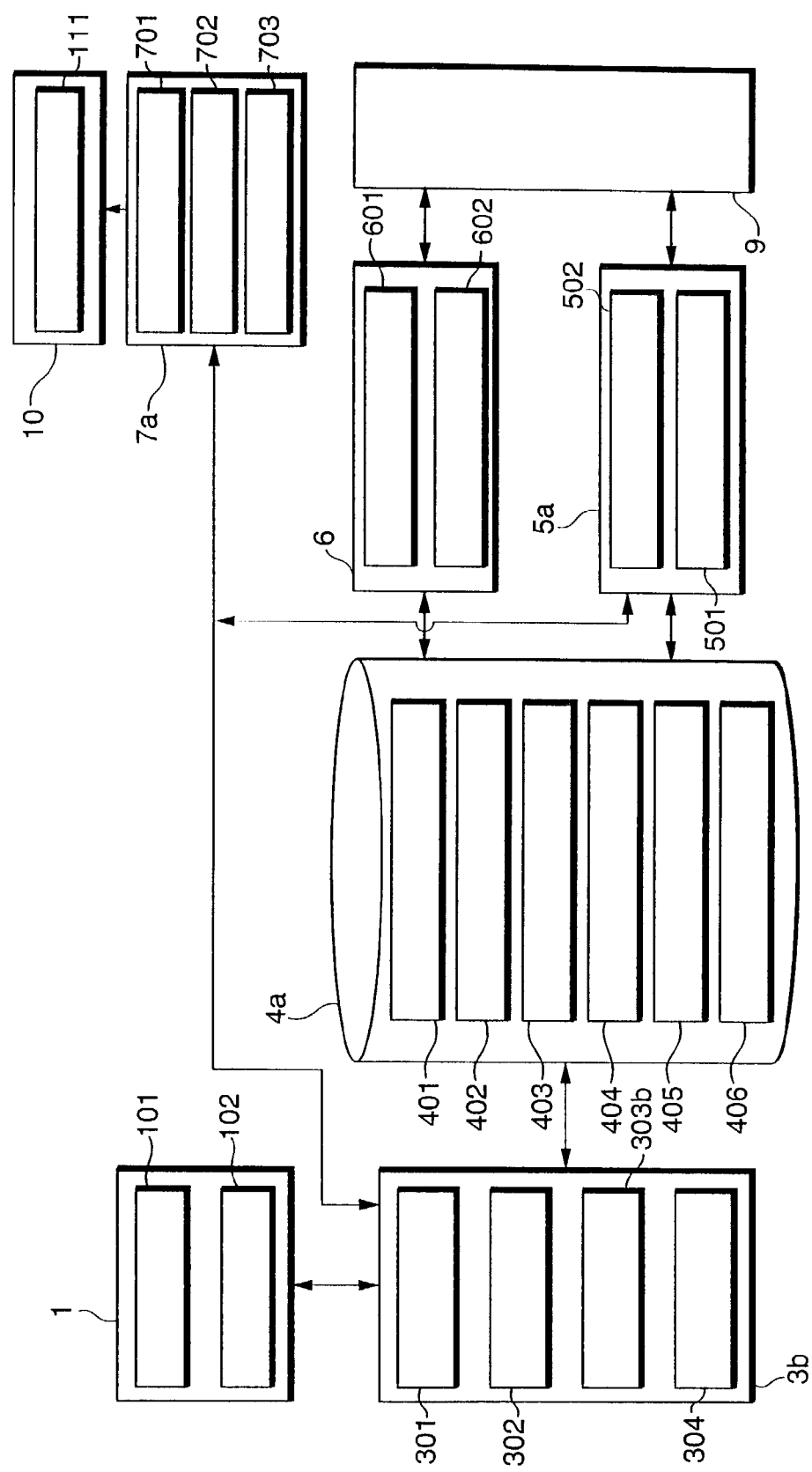
FIG. 15 is an explanatory diagram showing a modification of the embodiment 2.

FIG. 15 is an explanatory diagram showing a modification of the embodiment 2.

In the diagram, a contents settlement unit 5a has an access counter unit 502. The access counter unit 502 is a functional unit for counting the number of accesses in the case where the Web service server 7a accesses arbitrary contents. A contents storing unit 4a has an access number database (access number DB) 406. The access number database 406 is a database for administrating the number of accesses of every contents counted by the access counter unit 502. A contents distributing unit 303b of a contents registration distributing unit 3b has a function for registering the contents into the access number database 406 in the contents storing unit 4a in the case of distributing the link destination information of the contents in addition to the function of the contents distributing unit 303a in the embodiment 2.

Other constructions are similar to those in FIG. 13.

In the contents mediating system constructed as mentioned above, when the contents distributing unit 303b distributes the link destination information of the contents to the Web service server 7a, the contents is registered into the access number database 406. When the Web service server 7a accesses arbitrary contents, the access counter unit 502 in the contents settlement unit 5a counts the number of accesses and counts up a count value of the contents in the access number database 406. Thus, the settlement executing unit 501 in the contents settlement unit 5a makes a settlement according to the number of accesses such that the use rates and the intermediation fees corresponding to the number of accesses for one month are requested.

By counting the number of accesses and making a settlement according to the number of accesses as mentioned above, there are effects such that it is sufficient that the contents user makes a payment corresponding to the number of accesses and the contents provider can obtain an index for making good contents.

It is also possible to construct the system in a manner such that, in the case of using the contents, the user can select either a mode of setting the fee according to the number of accesses like a modification of the embodiment 2 or a mode of setting the fee irrespective of the number of accesses like an embodiment 2.

Embodiment 3

According to the embodiment 3, as a process of the contents analysis search unit for extracting the available contents by selecting or reorganizing the contents on the basis of a predetermined rule, the contents in which stability of composition is high is selected as contents of a use target.

<Construction>

Since a construction on the diagram is similar to that of each of the embodiments 1 and 2, its diagram is omitted and it will be explained with reference to the construction of FIG. 1.

The contents analysis search unit 6 in the embodiment 3 has a function for selecting the contents whose composition is stable in the case where there is a use request for certain contents from the contents user and the candidate contents are searched. That is, a golden sectional ratio is used as means for selecting the contents whose composition is stable and the contents in which each element in an image is close to golden sectional lines is selected. The contents analysis search unit 6 also has a function for selecting contents in which a position of an attention target in the image is close to the golden sectional lines.

Since other constructions are similar to those in the embodiments 1 and 2, their descriptions are omitted here.

<Operation>

Figure 16:
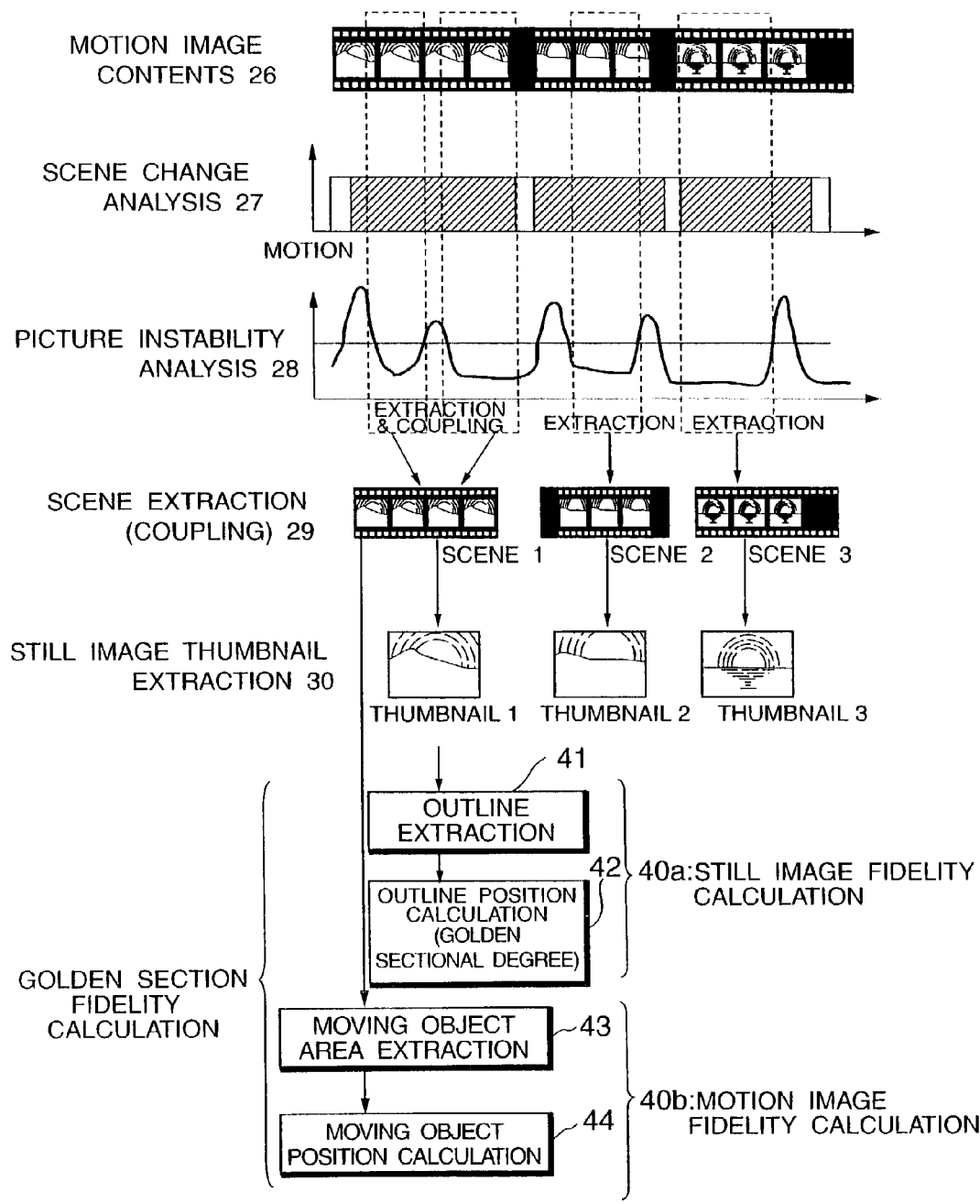
FIG. 16 is an explanatory diagram showing the operation of a contents analysis search unit in the embodiment 3.

FIG. 16 is an explanatory diagram showing the operation of the contents analysis search unit 6 in the embodiment 3.

As a golden section fidelity calculation 40 of the contents analysis search unit 6 in the embodiment 3, there are a still image fidelity calculation 40a and a motion image fidelity calculation 40b. The still image fidelity calculation 40a is a process for calculating a degree at which each element in the image is close to the golden sectional lines. The still image fidelity calculation 40a comprises an outline extraction 41 and an outline position calculation 42. The motion image fidelity calculation 40b is a process for calculating a degree at which the position of the attention target in the image is close to the golden sectional lines. The motion image fidelity calculation 40b comprises a moving object area extraction 43 and a moving object position calculation 44.

First, the operation of the still image fidelity calculation 40a will be explained.

Figure 17:
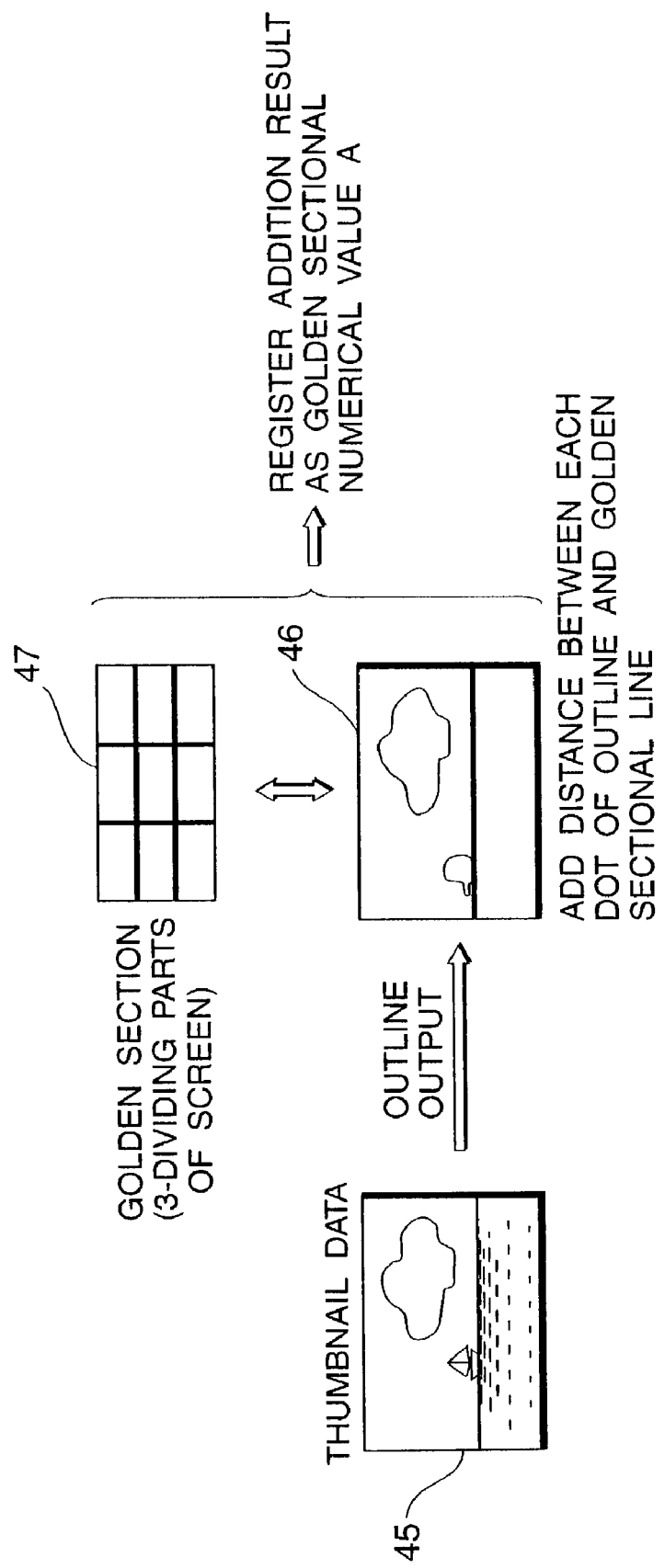
FIG. 17 is an explanatory diagram of the operation of a still image fidelity calculation.

FIG. 17 is an explanatory diagram of the operation of the still image fidelity calculation 40a.

The contents analysis search unit 6 analyzes an arbitrary thumbnail image 45 and extracts outline information 46 as an outline extraction 41. Subsequently, a distance between each dot constructing an outline in the outline information 46 and a closest one of golden sectional lines 47 (lines to divide a picture plane into three parts in each of the vertical and lateral directions) is calculated as an outline position calculation 42 and a sum of the calculated distances is obtained. This sum value is registered as a numerical value A into the scene contents database 402. It is determined that the smaller the sum value A is, the more the composition of the scene contents is close to the golden sectional position and the higher a possibility of the data having stability is.

The operation of the motion image fidelity calculation 40b will now be described.

Figure 18:
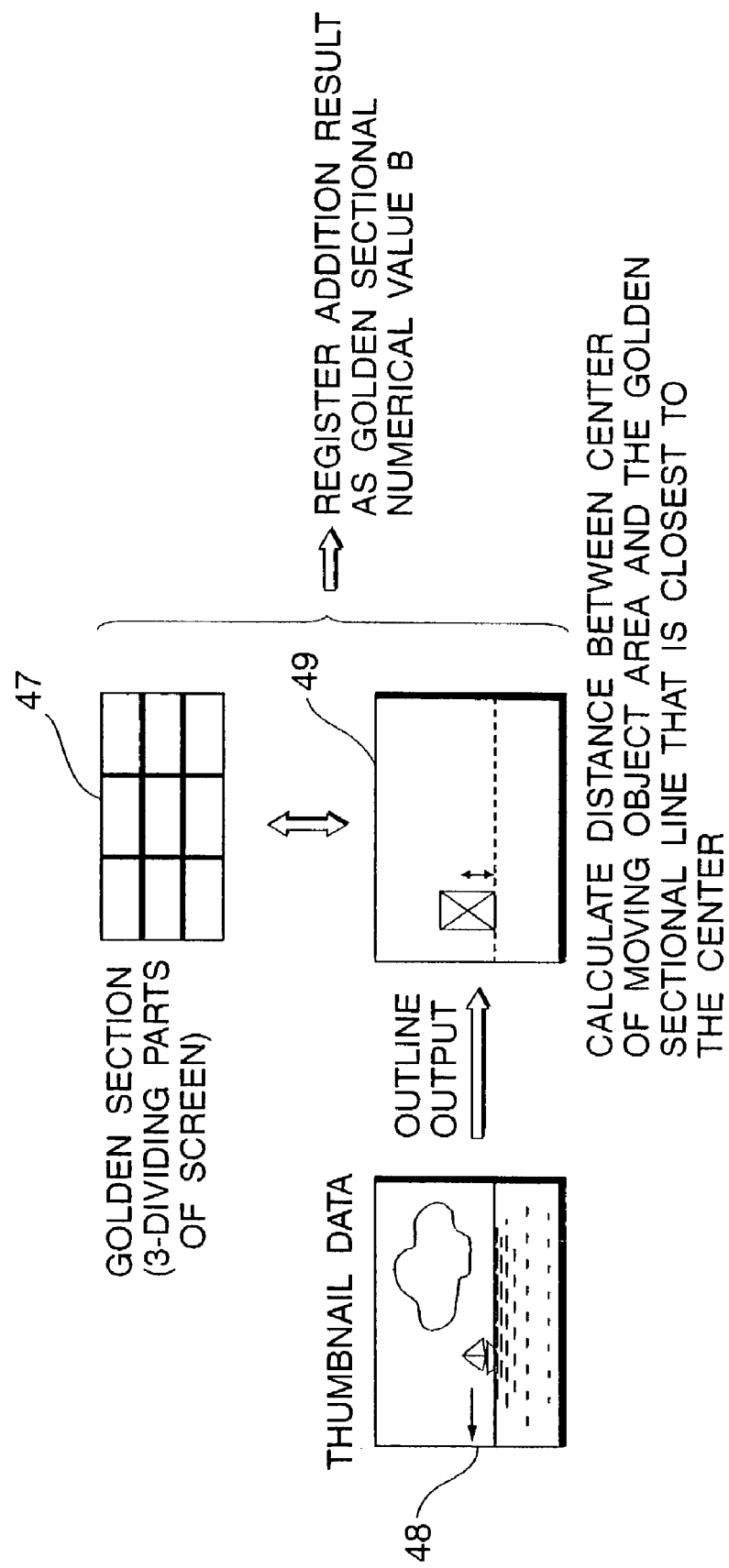
FIG. 18 is an explanatory diagram of the operation of a motion image fidelity calculation.

FIG. 18 is an explanatory diagram of the operation of the motion image fidelity calculation 40b.

As a moving object area extraction 43, the contents analysis search unit 6 analyzes a picture plane contents motion image 48 and, if there is a moving object in the picture plane, extracts its area information 49 by using this moving object as an attention target. Subsequently, as a moving object position calculation 44, a distance between the center of the area extracted by the area information 49 and the golden sectional line 47 that is closest to such a center is calculated and registered as a numerical value B into the scene contents database 402. It is determined that the smaller the value B is, the more the position of the moving object is close to the golden sectional position and the higher a possibility of the data having stability is.

Among the sum values of the numerical values A and B obtained as mentioned above, the contents analysis search unit 6 preferentially presents the small sum value as candidate data to the contents user. Thus, the contents user can use the image whose composition is stable as an index upon selection of the contents. The numerical values A and B can be also weighted. Further, the numerical values A and B of the stability can be also presented together with the candidate contents.

<Effects>

According to the embodiment 3 as mentioned above, since the image in which the stability of the composition is high is extracted as candidate contents, index information at the time of selecting the image whose composition is stable from a number of contents can be provided to the contents user. The contents user can easily search and it is possible to contribute to reduction of searching time.

Particularly, since the still image fidelity calculation 40a is executed, the contents in which the composition of the whole image is stable can be extracted. Since the motion image fidelity calculation 40b is executed, attention is paid to a specific target and the image in which the stability of the composition is high can be extracted.

Further, in the embodiment 3, a similarity calculation by the weighting with another feature similarity (similarity by the template matching, similarity with the keyword, or the like) can be also executed. That is, it is also possible that arbitrary weight values are given to another feature similarity and composition stability and the candidate contents is subsequently determined from a sum value of them. By using such a method, a fine search for desired contents can be executed.

In the embodiment 3, although the moving object has been used as an attention target in the case of the motion image, an arbitrary attention target can be used. Further, for example, the attention target can be also manually determined.

Further, in the embodiment 3, although the predetermined rule has been set to the golden section in the process which is executed by the contents analysis search unit 6, the invention is not limited to it. For example, it is also possible to use a rule such that contents of a triangular composition (composition in which elements serving as a theme in the image form a triangle (=Δ)) is extracted as a stable composition.

Embodiment 4

According to the embodiment 4, if the contents designated by the contents user does not exist in the contents storing unit 4, contents are collected.

<Construction>

Figure 19:
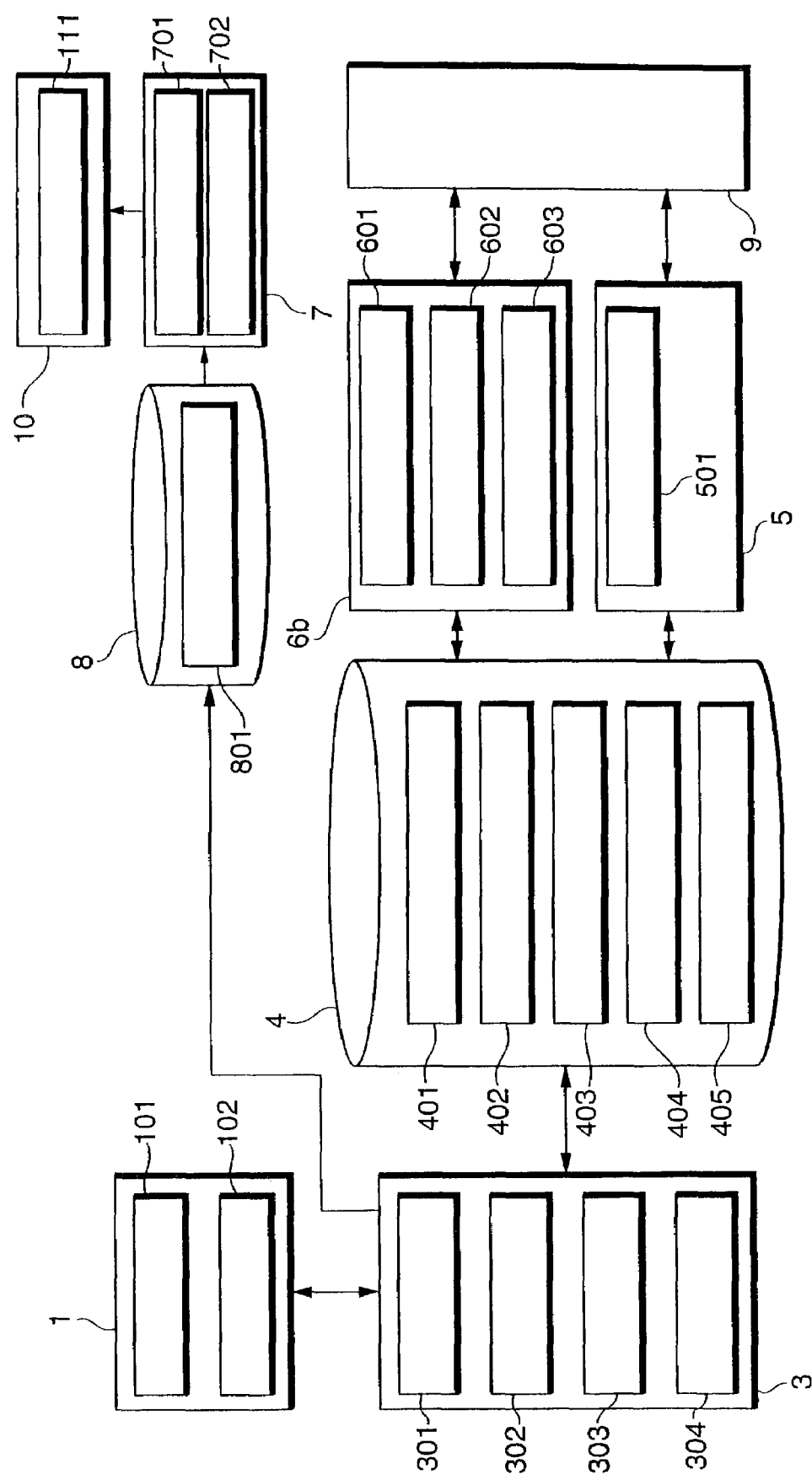
FIG. 19 is an explanatory diagram of the embodiment 4.

FIG. 19 is an explanatory diagram of the embodiment 4.

In the diagram, the embodiment 4 differs from the embodiments 1 to 3 with respect to a point that a contents collecting unit 603 is provided for a contents analysis search unit 6b. The contents collecting unit 603 has a function such that if scene contents which satisfies a request from the contents user does not exist as a result of search in the scene contents database 402 by the contents search unit 602, the contents are collected from the contents providers. The execution of such a collection denotes, for example, a function such that contents conditions which are required by the contents user are displayed on a member reference picture plane which is provided by the community and contents are collected or E-mail describing such conditions is transmitted to all members.

Since a construction of each of the other component elements is similar to that in the embodiments 1 to 3, their descriptions are omitted.

<Operation>

Figure 20:
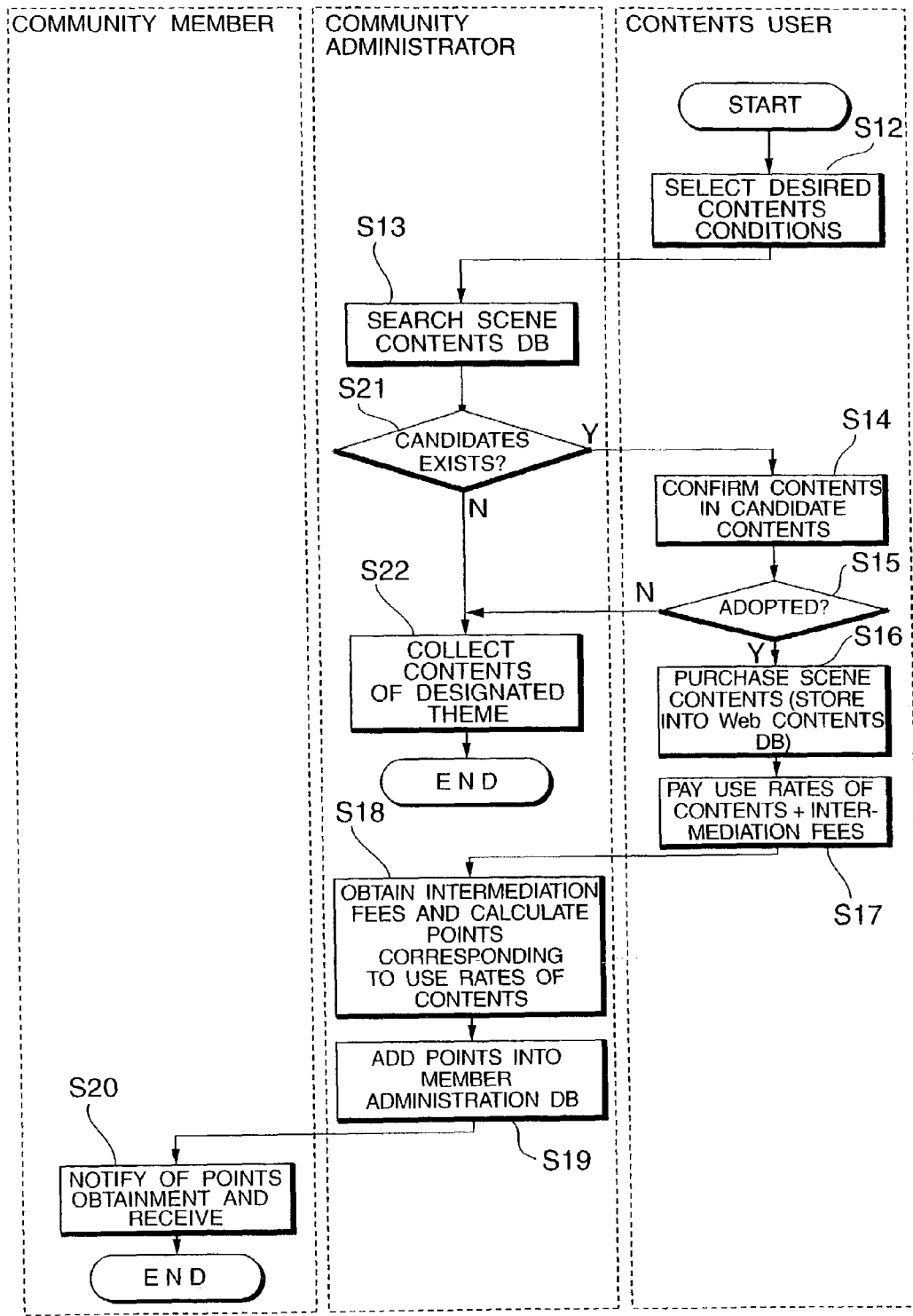
FIG. 20 is a flowchart for the operation which is executed when contents is searched and provided in the embodiment 4.

FIG. 20 is a flowchart for the operation which is executed when contents is searched and provided in the embodiment 4. Since the operation which is executed upon registration of contents is similar to that in the embodiment 1, its description is omitted here.

The flowchart of FIG. 20 corresponds to the flowchart of FIG. 6 in the embodiment 1. Processes in steps S21 and S22 shown in a block surrounded by a broken line are added to the operation in the embodiment 1. That is, the presence or absence of a candidate is discriminated as a result of the searching process of the scene contents database 402 in step S13 (step S21). If the candidate exists, contents in the candidate contents are confirmed in step S14. After that, if the candidate contents is used by the contents user in step S15, the subsequent operations are similar to those in the embodiment 1.

If there is no candidate in step S21 and if the candidate contents is not used in step S15, the contents collecting unit 603 is activated and the contents in which a theme has been designated is collected (step S22). For example, a theme "the evening sun is sinking into the Japanese sea", conditions designated by the contents user, an illustration designated by the contents user, or the like is/are displayed onto the member reference picture plane, or E-mail in which those conditions or the like are disclosed is transmitted to all of the members.

If the contents is provided by the collection of the contents, a contents registering process similar to that in FIG. 5 is executed and the provided contents is presented as one of the candidate contents to the contents user by the contents search unit 602.

<Effects>

According to the embodiment 4 as mentioned above, if the contents matched with the conditions which are requested by the contents user is not registered, the contents are collected. Therefore, a possibility that the contents user obtains the contents matched with the conditions is raised. The member of the community registers the contents matched with the collecting conditions, thereby raising a possibility that his contents is adopted. Therefore, it is possible to contribute to the improvement of ease of use of a contents mediating system.

<<Use Forms>>

Although the embodiments have been described with respect to the example of the digital watermark as means for discriminating whether the copyright information has been set or not, any means can be used so long as it can confirm whether the copyright information has been set or not. For example, means which can discriminate it by checking a specific image displayed on the contents, or the like can be used.

In each of the above embodiments, the information (explanation information which is inputted in step S10 in FIG. 5) which is supplemented into the contents by the contents provider is not limited to the text information, for instance, another audio sound or the like can be also used. In such a case, the contents can be searched together with the audio sound in the contents searching process.

Further, in each of the foregoing embodiments, it is also possible that the user evaluates the contents and a priority of the candidate contents which is presented to the user is set.

As described above, according to the invention, the contents which is provided by the contents provider is stored into the contents storing unit and if the contents use request is received from the person who wants to use the contents, the contents which satisfies the request is extracted from the contents storing unit, its use is permitted, the use consideration of the contents is collected from the person who wants to use the contents, and the provision consideration of the contents is paid to the contents provider, so that the following effects are obtained.

That is, the person who wants to use the contents can easily, reasonably, and certainly obtain various contents which can be commercially used without purchasing the expensive commercial contents. The contents provider can also receive a reward for the contents which he made as a hobby. It is possible to contribute to the growth of the network community of the contents sharing type.

The present invention is not limited to the foregoing embodiments but many modifications and variations are possible within the spirit and scope of the appended claims of the invention.

What is claimed is:

1. A contents mediating system for mediating contents selling between a user side system and a community system in which the user side system is used by a contents user and the community system has a plurality of member terminals used by members connected via a network where contents are created by at least one member and are used in common by said members of the community system, comprising:
   a contents registering and confirming section which accepts a registration of contents outputted from said member terminal and confirms whether said member is only to provide said contents in said community system as common contents; or, to provide said contents in said community system and allow members to sell said contents to said contents user as selling contents;
   a contents storing section which stores said contents that are registered by said contents registering and confirming section and identifies said common contents and said selling contents;
   a contents searching section which searches the contents storing section for said selling contents according to a request outputted from said user side system;
   a contents distributing section which distributes said selling contents searched out by said contents searching section to said user side system;
   a contents settling unit which receives a use fee of said selling contents used by said contents user from said user side system and pays said use fee to said member who provided said selling contents; and
   an analyzing portion that extracts a frame from motion image contents according to a scene change, as a still image thumbnail, then the analyzing portion analyzes pan, tilt, zoom of the motion image contents and motion speed of scene so as to decide the representative frame.

2. The contents mediating system according to claim 1, wherein said user side system includes a user terminal and said user request is outputted from said user terminal.

3. The contents mediating system according to claim 1, wherein said user side system includes a Web service server which stores a home page using said selling contents of said contents user; and said contents distributing section distributes said selling contents to said Web service server.

4. The contents mediating system according to claim 1, further comprising:
- a verifying section to verify an original property of the registered contents through judging whether an electronic watermark exists or not; and
- a copyright protecting section to insert the electronic watermark for protection use to the contents whose original property is confirmed.

5. A contents mediating system for mediating contents selling between a user side system and a community system in which the user side system is used by a contents user and the community system has a plurality of member terminals used by members connected via a network where contents are created by at least one member and are used in common by said members of the community system, comprising:
- a contents registerng and confirming section which accepts a registration of contents outputted from said member terminal and confirms whether said member is only to provide said contents in said community system as common contents; or, to provide said contents in said community system and allow members to sell said contents to said contents user as selling contents;
- a contents storing section which stores said contents that are registered by said contents registering and confirming section and identifies said common contents and said selling contents;
- a contents searching section which searches the contents storing section for said selling contents according to a request outputted from said user side system;
- a contents distributing section which distributes said selling contents searched out by said contents searching section to said user side system;
- a contents settling unit which receives a use fee of said selling contents used by said contents user from said user side system and pays said use fee to said member who provided said selling contents;
- an analyzing portion that extracts a frame from motion image contents according to a scene change, as a still image thumbnail, then the analyzing portion analyzes pan, tilt, zoom of the motion image contents and motion speed of scene so as to decide the representative frame; and
- a supplement inputting section to input information such as at least one of content explanation, photographing date, photographing place, classification, photographing condition of a scene corresponding to whole contents or a still image thumbnail, when the contents registration is performed or the contents analysis is performed to obtain the still image thumbnail.

6. The contents mediating system according to claim 5, wherein said contents searching section sets a search condition of desirable contents; compares similarities of said desirable contents and said selling contents to obtain a search result; presents said search result to said user side system so as to make said contents user select and specify said selling contents.

7. The contents mediating system according to claim 6, wherein said contents searching section uses text information of keywords in photographing date, photographing place, classification, photographing condition and content explanation, as said search condition; and uses a matching degree of said text information as said similarity in a similarity comparison.

8. The contents mediating system according to claim 6, wherein said contents searching section uses a template image as said search condition; and uses a similarity between a registration image or a still image thumbnail image and said template image in a similarity comparison.

9. The contents mediating system according to claim 8, wherein an illustration image or a computer graphics image is used as said template image.

10. The contents mediating system according to claim 8, wherein an image, to which a change in at least one of brightness, saturation, contrast with respect to a whole template image or a specification area or a change occurred by image process of filtering process are added, is used as said template image.

11. The contents mediating system according to claim 8, wherein said template image is made when setting said search condition by using an image process tool.

12. The contents mediating system according to claim 6, wherein a stability of composition is used as said search condition in a search condition setting; and a fidelity between an outline line position of a registration image, or a still thumbnail image and golden sectional line is used as similarity in a similarity comparison.

13. The contents mediating system according to claim 6, wherein a stability of composition is used as said search condition in a search condition setting; and a fidelity between a center position of a movement area in a motion image and a golden sectional line is used as similarity in a similarity comparison.

14. The contents mediating system according to claim 6, wherein arbitrary weight values of plural feature similarities are set as said search condition in a search condition setting; and a sum value of said arbitrary weight values of plural feature similarities is used as similarity in a similarity comparison.

15. The contents mediating system according to claim 14, wherein said plural feature similarities are composed of similarities of a matching degree of text information of keywords in photographing date, photographing place, classification, photographing condition and content explanation; a similarity between a registration image or a still thumbnail image and a template image; a fidelity between an outline line position of the registration image or the still thumbnail image and a golden sectional line; and a fidelity between a center position of a movement area in a motion image and the golden sectional line.

16. The contents mediating system according to claim 14, further comprising:
- a contents collecting section which, wherein when said selling contents correspond to said desirable contents, does not exist in said contents storing section, registers condition relative to said desirable contents; and performs a collection of contents with respect to said members in said community system on the basis of said condition relative to said desirable contents.

* * * * *